US005586156A

United States Patent [19]

Gaubatz

[11] Patent Number: 5,586,156
[45] Date of Patent: Dec. 17, 1996

[54] REACTOR PROTECTION SYSTEM WITH AUTOMATIC SELF-TESTING AND DIAGNOSTIC

[75] Inventor: Donald C. Gaubatz, Cupertino, Calif.

[73] Assignee: General Electric Company, San Jose, Calif.

[21] Appl. No.: 502,337

[22] Filed: Jul. 14, 1995

[51] Int. Cl.$^6$ .................................................. G21C 7/36
[52] U.S. Cl. .................. 376/216; 376/242; 364/186; 364/551.01; 364/571.02
[58] Field of Search .................................. 376/215, 216, 376/217, 242, 259; 364/186, 550, 551.01, 570, 571.02, 579; 371/36

[56] References Cited

U.S. PATENT DOCUMENTS

| | | | |
|---|---|---|---|
| 4,692,299 | 9/1987 | Crew et al. | 376/216 |
| 5,095,418 | 3/1992 | Arita et al. | 376/215 |

Primary Examiner—Daniel D. Wasil
Attorney, Agent, or Firm—James E. McGinness

[57] ABSTRACT

A reactor protection system having four divisions, with quad redundant sensors for each scram parameter providing input to four independent microprocessor-based electronic chassis. Each electronic chassis acquires the scram parameter data from its own sensor, digitizes the information, and then transmits the sensor reading to the other three electronic chassis via optical fibers. To increase system availability and reduce false scrams, the reactor protection system employs two levels of voting on a need for reactor scram. The electronic chassis perform software divisional data processing, vote ⅔ with spare based upon information from all four sensors, and send the divisional scram signals to the hardware logic panel, which performs a ¾ division vote on whether or not to initiate a reactor scram. Each chassis makes a divisional scram decision based on data from all sensors. Automatic detection and discrimination against failed sensors allows the reactor protection system to automatically enter a known state when sensor failures occur. Cross communication of sensor readings allows comparison of four theoretically "identical" values. This permits identification of sensor errors such as drift or malfunction. A diagnostic request for service is issued for errant sensor data. Automated self test and diagnostic monitoring, sensor input through output relay logic, virtually eliminate the need for manual surveillance testing. This provides an ability for each division to cross-check all divisions and to sense failures of the hardware logic.

21 Claims, 13 Drawing Sheets

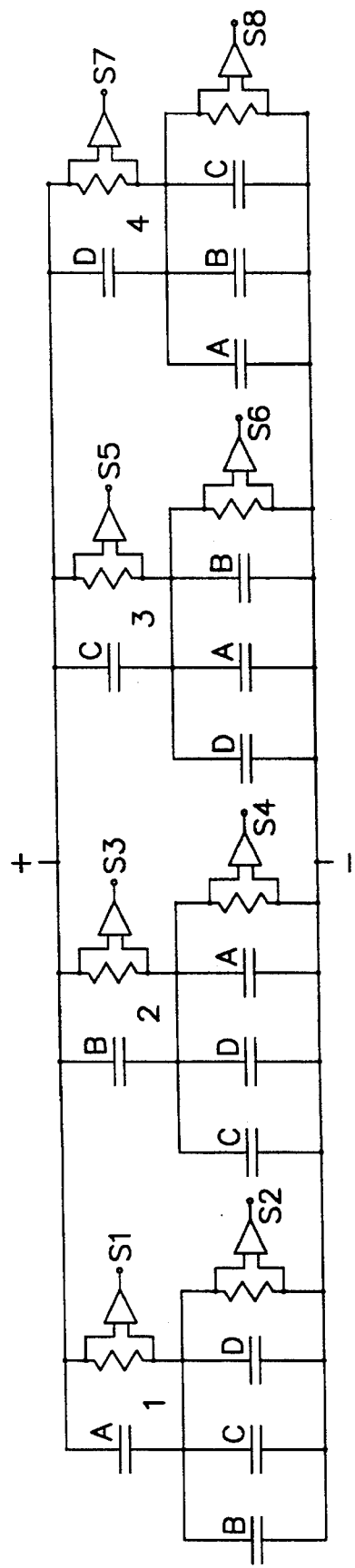
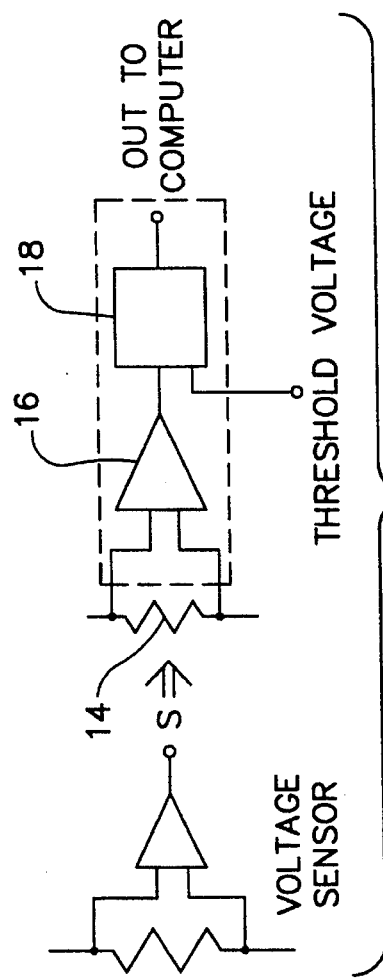
FIG. 8A
FIG. 8B 5,586,156

REACTOR PROTECTION SYSTEM WITH AUTOMATIC SELF-TESTING AND DIAGNOSTIC

The Government of the United States of America has rights in this invention in accordance with Contract No. DE-AC03-89SF17445 awarded by the Department of Energy.

FIELD OF THE INVENTION

This invention relates generally to protection systems for shutting down a system and maintaining it in a safe condition in the event of a system transient or malfunction. In particular, the invention relates to protection systems for shutting down a nuclear reactor and maintaining it in a safe condition in the event of a system transient or malfunction that could cause damage to the nuclear fuel core, most likely from overheating, or a release of radiation, endangering the public.

BACKGROUND OF THE INVENTION

Conventional reactor control systems have automatic and manual controls to maintain safe operating conditions as the demand is varied. The several control systems control operation of the reactor in response to given demand signals. Computer programs are used to analyze thermal and hydraulic characteristics of the reactor core for the control thereof. The analysis is based on nuclear data selected from analytical and empirical transient and accident events, and from reactor physics and thermal-hydraulic principles. In the event of an abnormal transient event, the reactor operator is usually able to diagnose the situation and take corrective action based on applicable training, experience and judgment. Whether the manual remedial action is sufficient or rapid enough depends upon the event and upon the operator's knowledge and training. If the event is significant (i.e., challenges any of the reactor safety limits), a reactor trip (also referred to as reactor shutdown, scram, or insertion of all control rods) may be required. Some transient events may occur quickly, i.e., faster than the capability of a human operator to react. In such an event, a reactor trip will be automatically effected.

A conventional nuclear reactor protection system comprises a multi-channel electrical alarm and actuating system which monitors operation of the reactor, and upon sensing an abnormal event initiates action to prevent an unsafe or potentially unsafe condition. The conventional protection system provides three functions: (1) reactor trip which shuts down the reactor when certain monitored parameter limits are exceeded; (2) nuclear system isolation which isolates the reactor vessel and all connections penetrating the containment barrier; and (3) engineered safety feature actuation which actuates conventional emergency systems such as cooling systems and residual heat removal systems.

An essential requirement of a nuclear reactor protection system is that it must not fail when needed. Therefore, unless the operator promptly and properly identifies the cause of an abnormal transient event in the operation of the reactor, and promptly effects remedial or mitigating action, conventional nuclear reactor protection systems will automatically effect reactor trip. However, it is also essential that reactor trip be avoided when it is not desired or necessary, i.e., when there is an error in the instrumentation or when the malfunction is small enough that reactor trip is unnecessary or when one shutdown function fails, the reactor protection system must not perform the next shutdown function if to do so would be unsafe.

SUMMARY OF THE INVENTION

The present invention is a reactor protection system (RPS) having four divisions, with quad redundant sensors for each scram parameter providing input to four independent microprocessor-based electronic chassis. Each electronic chassis acquires the scram parameter data from its own sensor, digitizes the information, and then transmits the sensor reading to the other three RPS electronic chassis via optical fibers. To increase system availability and reduce false scrams, the RPS employs two levels of voting on a need for reactor scram. The electronic chassis perform software divisional data processing, vote ⅔ with spare based upon information from all four sensors, and send the divisional scram signals to the hardware logic panel, which performs a ¾ division vote on whether or not to initiate a reactor scram. Each chassis makes a divisional scram decision based on data from all sensors. Each RPS division performs independently of the others (asynchronous operation). All communications between the divisions are asynchronous.

The reactor protection system logic is designed to provide fault tolerance, enhanced reliability, increased availability and improved separation. Features of this system include the ability to have a failed sensor without reducing the level of protection or increasing the likelihood of an inadvertent reactor trip. The design in accordance with the present invention eliminates the need for manual bypasses, virtually eliminates the need for operator action, and achieves fault tolerance without custom design components.

The RPS is designed to withstand multiple failures in almost all of its components. Its logic has the following major performance enhancement characteristics:

First, the exchange of sensor readings and multiple sensor voting capability within each division provides high scram reliability. This can be seen by considering the case where a scram condition exists in the reactor, which is picked up by any three sensors, assuming all sensors and their data are good and not outside the failed sensor limits. For this case, the RPS would generate scram signals in all four divisions, a highly reliable reactor scram configuration. Most conventional protection systems would only generate a scram signal in three divisions. Scram reliability is also high for scram scenarios involving good sensors that indicate scram, and failed sensors that have even failed low, since for such scenarios the RPS produces scram signals based on good sensors, and is not inhibited by failed low sensors.

Second, multiple sensor voting within each division provides discrimination against spurious scrams due to sensor malfunctions. Thus, if a sensor of one scram variable erroneously indicates scram in one division, and a sensor of a second variable erroneously indicates scram in another division, the RPS would vote out the erroneous readings and would not generate a scram signal.

Third, automatic detection and discrimination against failed sensors allows the RPS to automatically enter a known state when such failures occur. There is no uncertainty as to whether the sensors have failed high or low, or whether the operator has taken the correct manual bypass action.

Fourth, cross communication of sensor readings allows comparison of the four theoretically "identical" values. This permits identification of sensor errors such as drift or malfunction. A diagnostic request for service is issued for errant sensor data.

Fifth, automated self test and diagnostic monitoring, sensor input through output relay logic, virtually eliminate the need for manual surveillance testing. This provides an ability for each division to cross-check all divisions and to sense failures of the hardware logic.

BRIEF DESCRIPTION OF THE DRAWINGS.

FIG. 8A is a circuit diagram showing the switch contact electrical equivalent circuit for the voltage application hardware logic.

FIG. 8B is a circuit diagram of the voltage sensor incorporated in the hardware logic shown in FIG. 8A.

DETAILED DESCRIPTION OF THE PREFERRED EMBODIMENTS

The reactor protection system of the invention will be described in detail hereinbelow in terms of application to an exemplary nuclear reactor (namely, a liquid metal-cooled breeder reactor). However, it should be noted that the concept is not limited to breeder reactors but is also applicable to light water reactors, gas-cooled reactors, etc. The invention also provides a highly reliable, fault-tolerant safety system which can be employed with any process or system where critical parameters are monitored for the initiation of a safety action.

Figure 1:
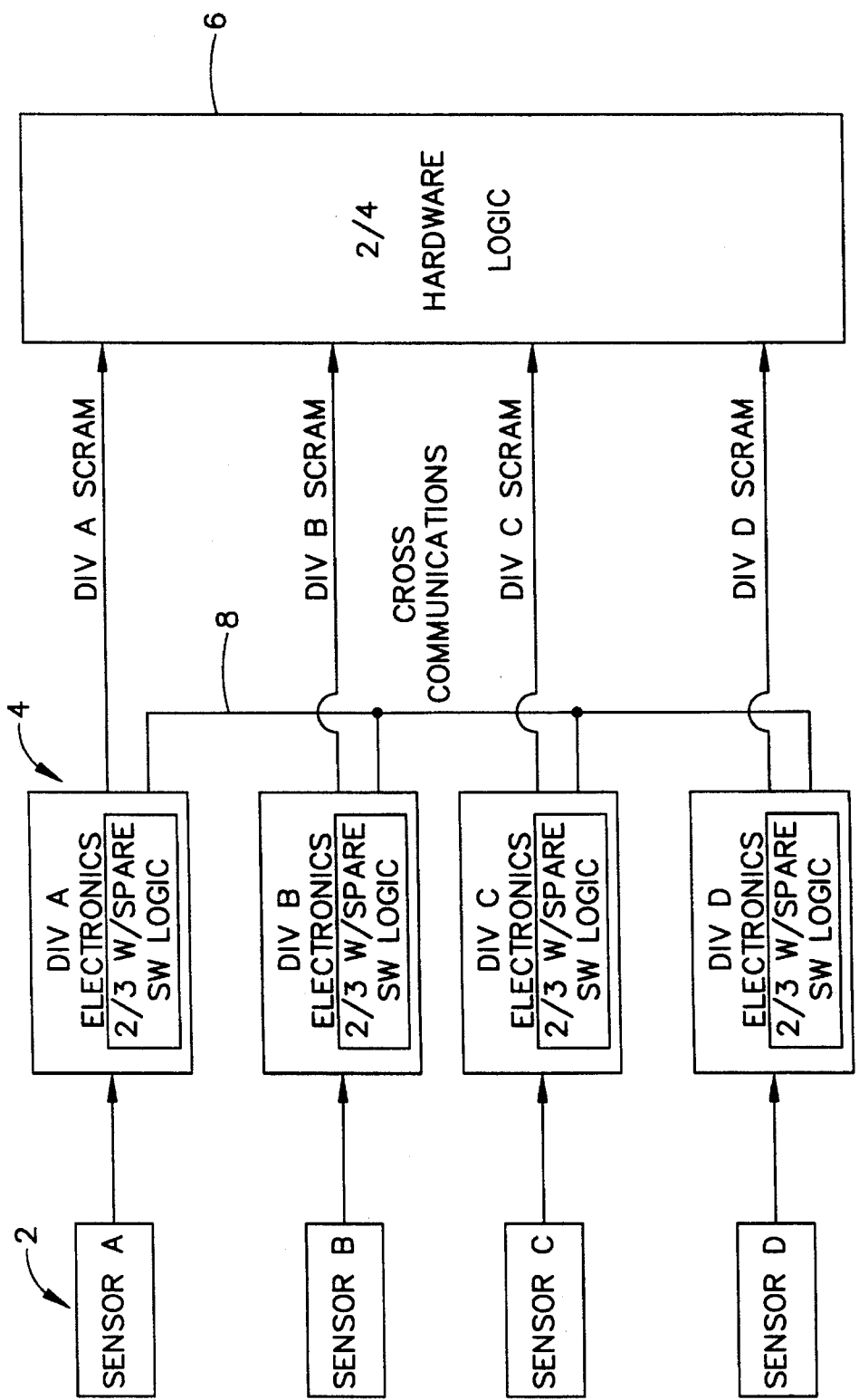
FIG. 1 is a block diagram of a reactor protection system in accordance with the invention.

Referring to FIG. 1, the reactor protection system (RPS) in accordance with the present invention is a four-division system, with quad redundant sensors 2 for each scram (safe shutdown—also called "trip") parameter providing input to four independent microprocessor-based electronic chassis 4. The electronic chassis perform software divisional data processing based upon information from all four sensors and send the divisional scram signals to a hardware logic panel 6. To increase system availability and reduce false scrams, the RPS employs two levels of voting on a need for reactor scram: a software 2/3 with spare voting on the need for scram from the sensed data, followed by a 2/4 division hardware logic vote on the execution of a scram command.

Each RPS division acquires the scram parameter data from its own sensor, digitizes the information, then transmits the sensor reading to the other three RPS divisions. Each electronics chassis 4 is coupled through dedicated optical fibers 8 to the other three so that each chassis sees and makes a divisional scram decision based on data from all sensors. Each division evaluates the data from the other three divisions (e.g., division A processes the data from divisions B, C and D), while holding its own data as "spare". For example: division A evaluates B, C and D data and votes 2/3 for scram; division B evaluates A, C and D data and votes 2/3 for scram; division C evaluates A, B and D data and votes 2/3 for scram; and division D evaluates A, B and C data and votes 2/3 for scram.

If data are invalid or missing from any of the other divisions, the processing division automatically substitutes its own sensor reading. A 2/3 software vote is taken on the need for scram by each division. If a scram is called for, each division outputs a scram command to its own 2/4 hardware logic relays. If all cross communications between divisions for the exchange of data should fail, each division independently evaluates the need for scram based on its own sensor readings. The hardware logic continues to require 2/4 divisions to call for scram before the scram sequence is begun. This failure mode (no cross communications) means the RPS is performing like a conventional quad redundant, protection system.

The automatic substitution of a division's own sensor data, in the event of invalid or missing data from the other divisions, means that no bypassing is required for divisional testing, calibration, servicing, maintenance, repair or replacement.

With one division "off line" a "failsafe" scram command is issued by that division to the 2/4 hardware logic (a "half scram" condition for the conventional protection system). However, with the RPS of the present invention, the "half scram" is shielded from inadvertent scram action by each operating division's software logic requiring 2/3 sensor readings to indicate a need for scram before sending a scram command to the hardware logic.

The reactor parameters used by the RPS for scram are neutron flux, core inlet and outlet temperature, primary flow (calculated from core inlet sodium and cover gas pressure sensors), and sodium level in the reactor. In addition, the RPS scram parameters include secondary sodium (intermediate loop) pressure and containment radiation level and pressure. All design basis events for which scram is required (such as transient overpower, loss of primary flow, IHX rupture, vessel leak, excessive pressure in the secondary from a steam generator sodium-water reaction) are sensed through deviations in these parameters.

Figure 4:
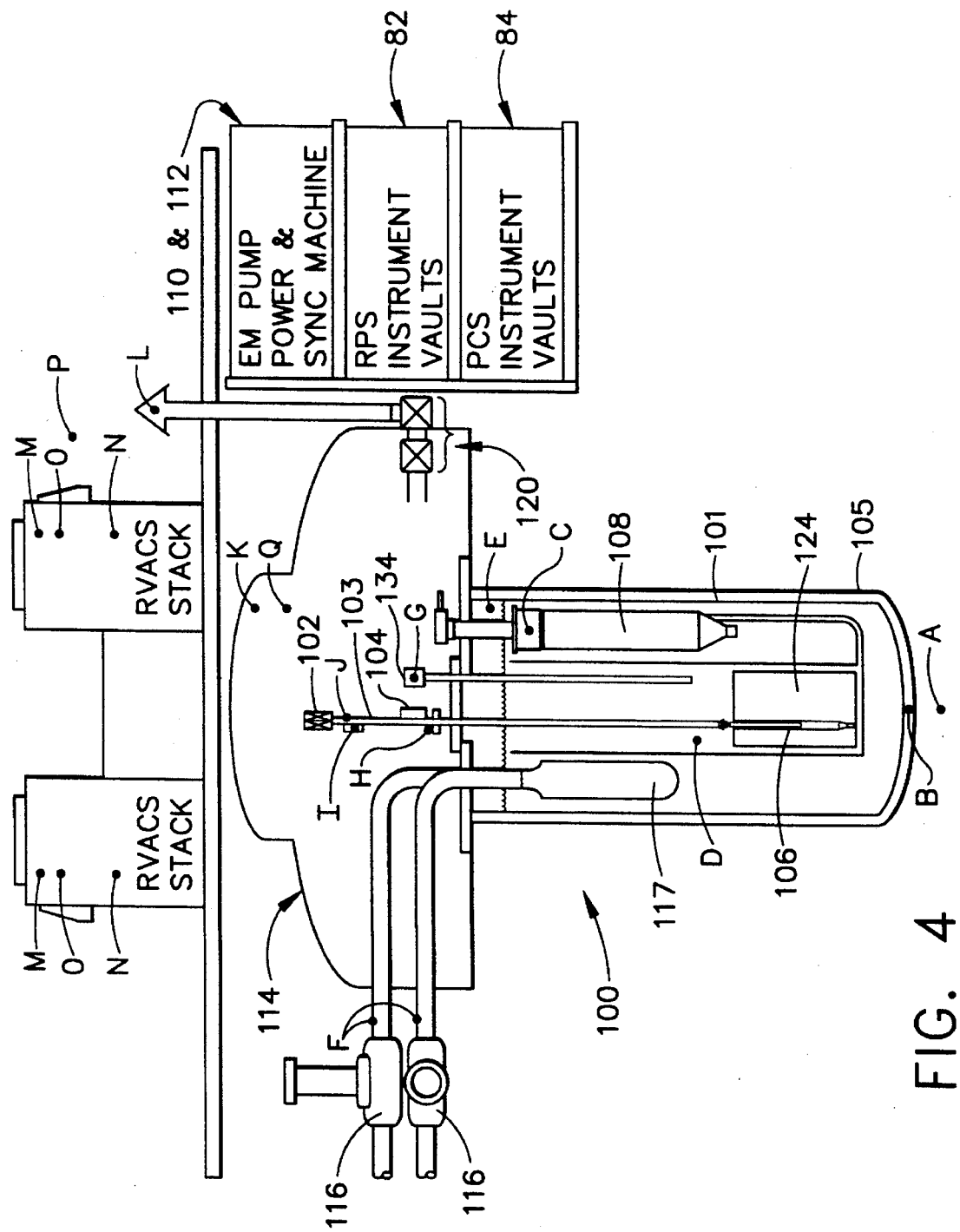
FIG. 4 is a schematic diagram showing the reactor protection system sensor locations in accordance with a preferred embodiment of the invention.

The neutron flux is measured by monitors located within conduits at the reactor bottom A (see FIG. 4). Core inlet temperature is measured by thermocouples located in the discharge plenum of each pump C. Core outlet temperature is measured by thermocouples located approximately 5 ft above the core to obtain the mixed mean outlet temperature rather than the outlet temperature of a single assembly D. Primary flow is derived from measurements by pressure sensors located in the discharge plenum of each pump C and in the cover gas region E. Primary sodium level is measured by conventional level sensors inside the reactor G. Secondary sodium pressure is measured by pressure sensors in the secondary pipes outside the reactor but close to the IHTS valves F. All sensors are located within instrument thimbles or conduits for easy servicing and replacement. Quad redundancy is maintained for each RPS trip parameter.

The general location of each RPS sensor is shown in FIG. 4. These sensors are as follows: A) neutron flux; B) sodium leakage (into the space between the reactor vessel 101 and the containment vessel 105); C) core inlet temperature, EM pump pressure, TSS pump temperature; D) core outlet temperature; E) cover gas pressure; F) IHTS pressure; G) sodium level (level probe 134); H) carriage bottomed switches; I) rod stop position; J) carriage position; K) upper containment radiation; L) CVIS effluent radiation; M) RVACS exit temperature; N) RVACS mass flow; O) RVACS effluent radiation; P) ambient air temperature; and Q) containment pressure. All penetrations for in-vessel sensors and actuators are made through the reactor head. There are no penetrations in the reactor vessel walls. The sensor and actuator cables come out through penetrations in the domed containment to the RPS electronics located in the RPS vaults. There are no RPS electronics in the reactor or containment.

In addition to having scram action based upon the direct measurement of parameters, the RPS also uses these data in calculations (ratios, rate of change, event counting, correlations, time between events, levels, els, percentages, etc.) as the basis for scram action.

The RPS minimizes the need for human intervention by having three distinct modes of automatic operation: (1) Shutdown/Maintenance—reactor shutdown, not operating; (2) Startup/Operate—normal reactor operation; and (3) Scram—reactor emergency shutdown.

To minimize human error and increase safety, in each mode of operation, the operator input to the RPS is well defined and limited. In the Shutdown/Maintenance mode, normal reactor maintenance, refueling, testing and calibration activities can occur. The RPS responds to operator requests to permit the necessary maintenance activities. The RPS does not permit actions that could lead to reactor power operation. When reactor power operation is desired, the operator must request a mode change to the Startup/Operate mode.

In response to an operator input request to change to the Startup/Operate mode, the RPS first satisfies itself that all monitored parameters and its own operation are nominal. Part of the RPS startup checking includes a comparison of all RPS software (including setpoints) with a fifth software file, independently maintained by the control room reactor operators. This comparison is made by the plant control system (PCS) with the RPS awaiting a positive response before continuing with the mode change. If there is even a one-bit error, the RPS will not transition to the Start up/Operate mode until the discrepancies have been resolved. The RPS then facilitates reactor startup and operation. In the Startup/Operate mode, the RPS only responds to two operator input requests: SCRAM or Return to the Shutdown/Maintenance mode. A SCRAM request causes the RPS to interrupt its current data processing, etc. and immediately begin the reactor scram sequence. A request to return to the Shutdown/Maintenance mode is only executed if the control elements have been placed in their fully inserted position (minimum reactor power) as for shutdown, refueling and or maintenance. If the control elements cannot be fully inserted, a SCRAM request must be issued for the protection system to initiate a scram sequence and shut the reactor down.

If the RPS executes a scram sequence automatically or in response to an operator input request, the RPS enters the Scram mode. In this mode, the reactor is fully shut down and, presumably, cooling. The only recovery from the Scram mode is a manually input request to return to the Shutdown/Maintenance mode. This satisfies a "Deliberate operator action to return the safety systems to normal" requirement and begins recovery from scram.

Normal transitions are made from the Shutdown/Maintenance mode to the Startup/Operate mode and from the Startup/Operate mode to the Shutdown/Maintenance mode. In the event of a reactor trip, the RPS will automatically go into the Scram mode where the only request recognized will be a manually input request to change to the Shutdown/Maintenance mode for post-scram analysis, testing, repair (if necessary), refueling, etc. The RPS and all sensor inputs must be nominal and operating correctly before the RPS will honor an operator input request to change from the Shutdown/Maintenance mode to the Startup/Operate mode and permit the PCS access to the control rods for startup. The RPS is an independent system interlocking the PCS. By design, the RPS must be operational before the PCS can operate. A request for a normal change from the Startup/Operate mode to the Shutdown/Maintenance mode will be honored only if all control rod carriages are "bottomed" and the reactor is at shutdown power. A transition from the Startup/Operate mode to the Scram mode can be made at any time by manually initiating a scram.

Figure 2:
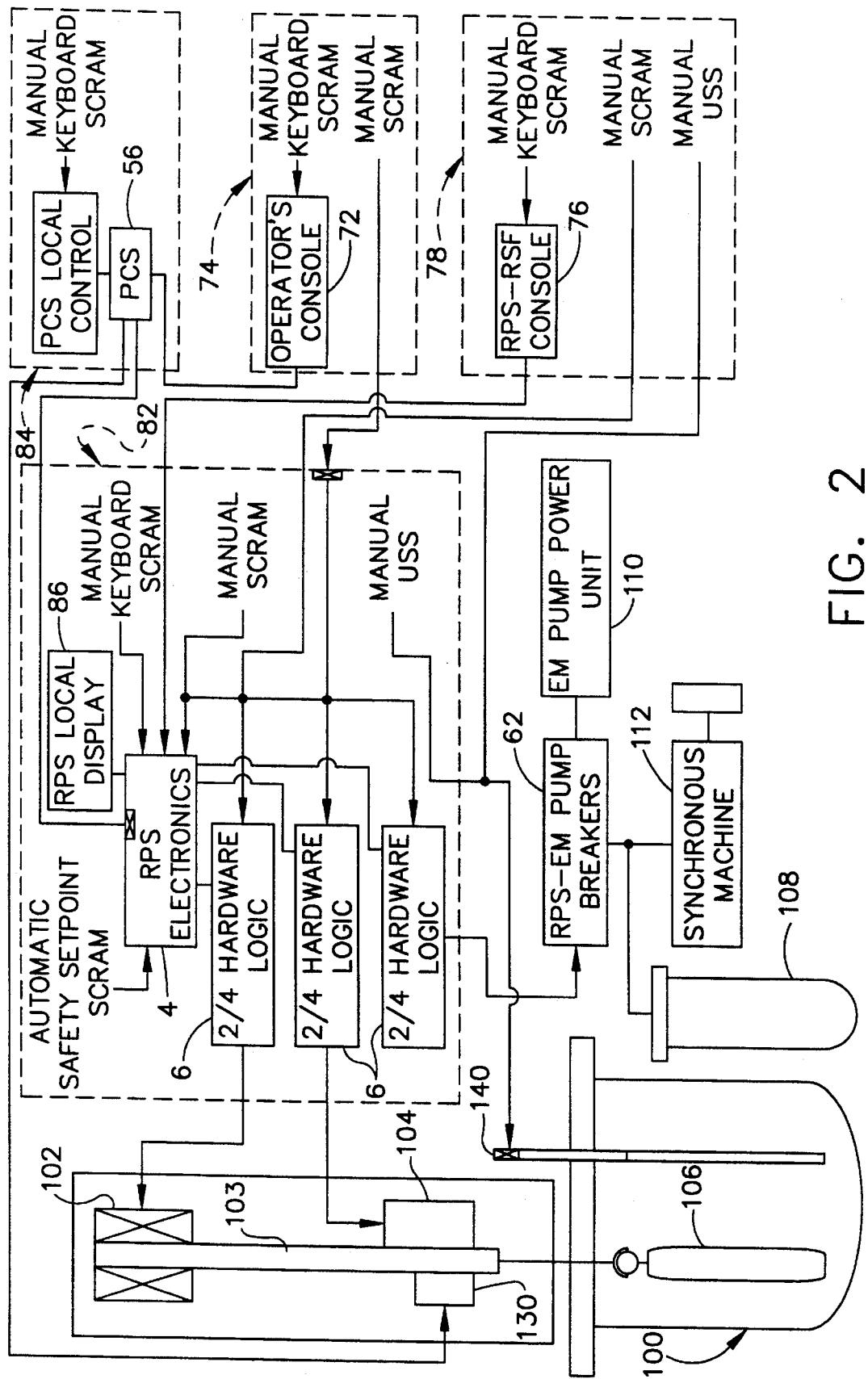
FIG. 2 is a block diagram showing the operator interfaces with a reactor protection system in accordance with a preferred embodiment of the invention as applied to a liquid metal reactor, which is depicted schematically.

A manual scram may be started from any of several locations. Referring to FIG. 2, manual scram may be started by simultaneously pressing two dedicated safety system SCRAM buttons that bypass all electronics. An electronic scram is automatically invoked as a backup action to the manual command. Scram buttons are located at the operator's console 72 in the main control room (MCR) 74 or the console 76 in the remote shutdown facility (RSF) 78, and at the control panel for each division of the RPS. Alternatively, manual scram may be started by requesting the RPS to initiate a scram sequence by typing an appropriate command on a computer keyboard communicating with the RPS. The keyboard may be at the operator's console in either the MCR or the RSF, at the control panel for each division of the RPS in the RPS instrumentation vaults 82 or at the control panel for each division of the PCS in the PCS instrumentation vaults 84. The vaults are supported on a seismically isolated reactor base mat.

Figure 3:
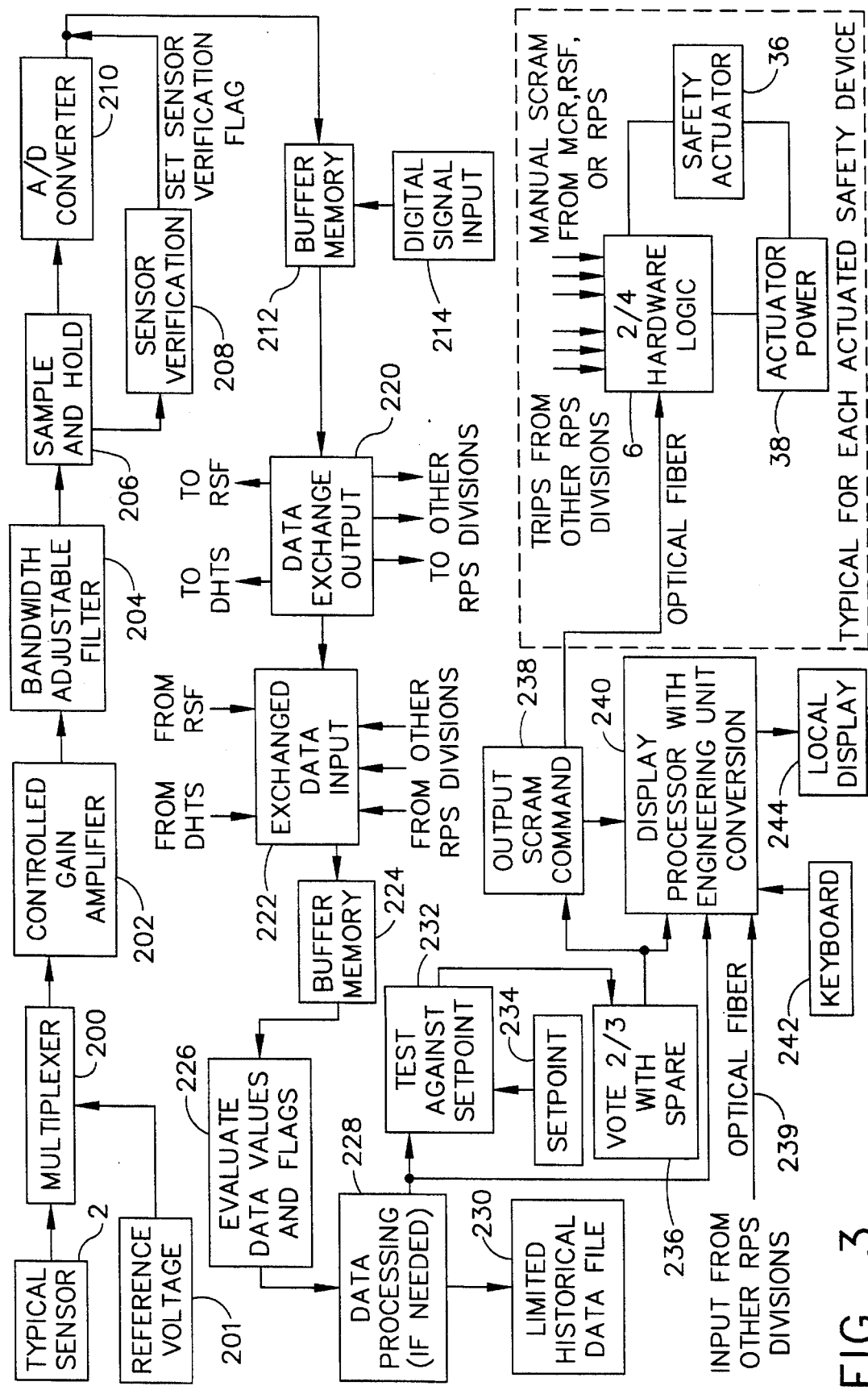
FIG. 3 is a block diagram of the logic for one division of a reactor protection system in accordance with the preferred embodiment of the invention.
Figure 5:
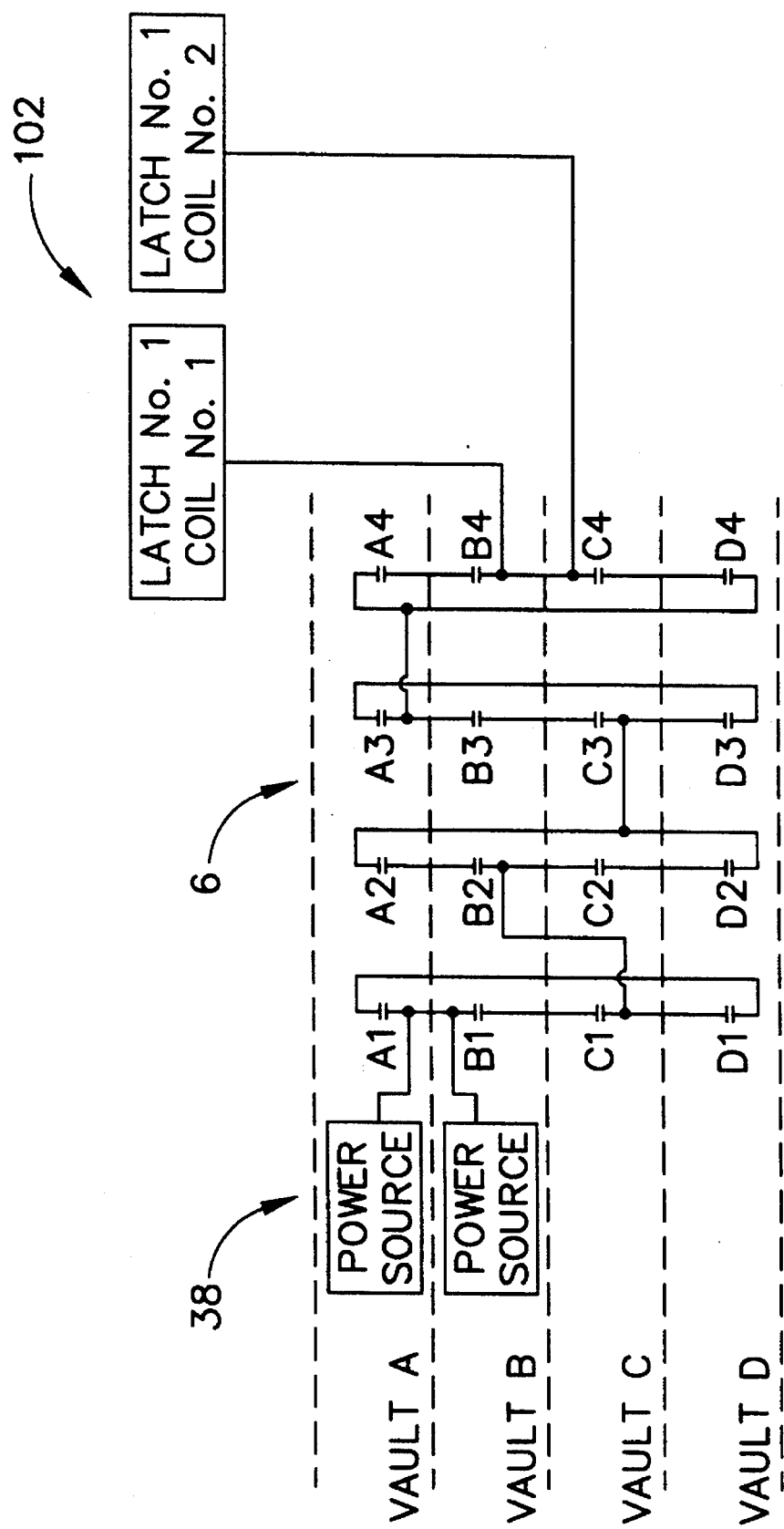
FIG. 5 is a circuit diagram showing the physical arrangement of the switch contacts in a typical two-out-of-four current interrupt switching hardware arrangement in accordance with a preferred embodiment of the invention.

The RPS of the present invention is divided into four identical divisions, each located within its own seismically isolated instrument vault 82 adjacent to the reactor upper containment area 114 (see FIG. 4). Each division is provided with its own sensor for each measurement parameter. Thus, there are four identical sensors for each monitored parameter. As seen in FIG. 3, a division consists of a multiplexer 200 connected to a sensor 2 and a reference voltage 201. The selected voltage is then amplified by a controlled gain amplifier 202 and filtered by a bandwidth adjustable filter 204. The filtered signal is sampled by sample and hold circuit 206 and digitized by analog-to-digital converter 210. The sensor verification flag is set by the sensor verification circuit 208. The digitized parameter value and its associated sensor verification flag are stored in buffer memory 212. Digital signals are input at this point 214. Digital inputs include the hardware logic diagnostics, carriage bottomed switches, valve position sensing switches, rotating plug seated and locked interlocking switches, "card out of file" sensors, etc. The data in buffer memory 218 is then communicated to the other divisions, to the data handling and transmission system (DHTS) and to the RSF via data exchange output 220. Conversely, data from the other divisions, from the DHTS and from the RSF is received via exchanged data input 222 and stored in buffer memory 224. The central processing (software logic) unit then evaluates the data values and flags (step 226), processes the data if necessary (step 228), inputs the new data into the limited historical data file 230, tests the parameter value against the set point retrieved from read only memory 234, performs the ⅔ with spare vote (step 236), and then outputs a scram command (step 238), if required, to the ¾ hardware logic 6, which also receives trips from other RPS divisions and manual scrams from the MCR, RSF or RPS. In addition, the vote results, scram command and parameter values are output to a display processor 240, which converts the parameter values into engineering units. This information is then displayed on local display 244. The display processor also receives data from other RPS divisions via optical fiber 239 and data input by the operator via keyboard 242. In response to at least two trips, the ¾ hardware logic changes state and, depending on whether the safety actuator 36 is to be turned on or turned off, either opens or breaks the connection between the safety actuator and its power supply circuit 38. In the example shown in FIG. 5, hardware logic 6 controls the supply of power from dual uninterruptible battery-backed power supplies 38 to the control rod latch coils 102 of a liquid metal reactor.

The four divisions of the RPS operate asynchronously, in parallel (with inter-divisional data exchange) as a single fault-tolerant system. The four divisions share their sensor data via inter-divisional optical fiber cables. Two levels of voting (software followed by hardware) are employed to reduce spurious scrams, eliminate the need for bypassing and maintain a high reliability for initiation of a safe shutdown sequence when needed and provide a high protected system availability by preventing spurious scrams. Each division votes 2 out of 3 on the data from the other three divisions (with each division holding its own sensor data as spare) to determine whether scram should occur. Each division's output goes to trip breakers in the actuator power circuit arranged to provide a hard-wired 2 out of 4, failsafe logic for each RPS actuation. The 2 out of 3 with spare software voting in each division is accomplished by fully qualified software. The 2 out of 4 inter-divisional voting for safe shutdown is accomplished by hard-wired logic utilizing optically isolated relays, contactors, or breakers. As used in the claims, the term "breakers" encompasses relays, contactors or breakers.

A division holds its own sensor's data as spare while processing the data obtained from the other three divisions. If any data is missing or fails to verify or validate, the division will automatically substitute its own sensor reading. If a division's own sensor data is also faulty, the division will evaluate the need for scram based upon the remaining two good communicated sensor readings. A division will evaluate the four sensor readings to assure "sameness", then continue to process the information and vote 2 out of 3 on the need for a trip. If a trip is called for, the division will actuate its trip breakers in the 2 out of 4 hard-wired logic network. With this logic, one division may fail or be taken out for service and returned at any time without causing a trip or requiring a bypass. Two sensors for a safety parameter are still required to indicate the need before a scram command will be issued even if one division is not operating. The off-line division will automatically be accepted back on-line without the need for any special procedures or software.

The use of inter-divisional communication to transfer data and permit a ⅔ software vote for scram in each division provides the RPS design with a significant availability improvement over conventional RPS designs. For conventional designs, each division reads only its own sensor and gives a divisional scram on the basis of ⅟₁ logic. Thus, if one division is down and the hardware logic is in a half scram state, the conventional protection system will result in a scram if any one of the other sensors indicates scram or fail (making it prone to inadvertent scrams), whereas the RPS still requires two of the remaining good sensors to indicate scram before it issues a trip command.

The improved resistance to inadvertent scrams permits one division of the RPS to be taken off-line automatically for periodic end-to-end self testing and calibration, service or replacement. There is no need for any manual switching or bypassing. This is because even if one division is taken off-line, the other divisions retain their ⅔ sensor scram software logic such that it still takes two sensor readings exceeding the scram set point to result in the execution of a scram. A division may be taken off-line for service at any time without the need for a bypass, without fear of an inadvertent scram, without any reduction in the protection offered, and without the need for any special consideration to bring the division back on-line. The elimination of manual bypasses reduces the incidence of inadvertent scrams due to operator error. In the presence of two failed sensors for a given parameter, the RPS will modify its software to a ½ logic and issue a trip command if either of the two remaining good sensors indicates the need for a trip.

A description of key features of the RPS design in accordance with the invention is given below.

Input Data Processing

Each division of the RPS electronics receives sensor inputs either by direct analog or digital connection or through a sensor signal conditioning device. There is no data bus between the RPS electronics and the sensors. All division sensor inputs appear continuously on that division's input cards and are read in by commands from the division's central processing unit (CPU). Referring to FIG. 3, the input data processing for each trip sensor consists of the following steps:

1) Read input data from the first RPS sensor 2. Analog inputs are amplified by an analog amplifier 202 (gain is set to accommodate individual sensor calibrations and appropriate safety set points for sensor signal voltage normalization) and passed through an anti-aliasing filter 204 (to reduce noise). All sensor inputs are processed as a normalized voltage. Conversion to engineering units is only done for the man-machine interface, not for the protection system calculation. Processing the sensor readings as a normalized voltage simplifies and reduces the algorithms necessary for data evaluation.

2) Sample and hold (block 206 in FIG. 3) the normalized sensor signal voltage value. [It is this voltage value that is used both for A/D conversion and for sensor verification.]

3) Perform analog-to-digital (A/D) conversion (block 210) on input reading.

4) In parallel with the A/D conversion, the sampled analog voltage reading is averaged with the past few readings and compared to predetermined sensor reason-ability limits for indication of sensor failures (block 208). Bad sensors are flagged by exception so that a "sensor verification" flag is set for good sensors and not set for bad sensors.

5) Form a data word which includes the sensed parameter identifier, sensor identification, reading, verification flag, validation flag, time tag; then store that data word in a buffer memory.

6) Steps 1–4 are repeated for the next polled sensor in that division, so that after one polling cycle, a data word for each of the division's polled sensors is stored in a data buffer.

7) The digitized sensor data for all input readings taken during the polling cycle, along with the verification flags and the sensor identification and data time tags, are now ready to be shared with other divisions. Prior to sending to other divisions, a processing division identifier is also added to the data word.

All four RPS divisions perform this input data processing in parallel, asynchronously, with their own sensors, continuously and in real time.

Inter-Divisional Data Communications

Each division sends its data to all other divisions via optical fiber cables 8 (FIG. 1) which provide electrical isolation. This inter-division, asynchronous, cross communication provides for sensor data exchange between the divisions. The data exchange function allows each division to have all four sensor readings for a given parameter along with a processing division identifier and flags that delineate the validity of the data. Data are exchanged through serial data ports. Each RPS division has three output and three input ports for this purpose.

When data are ready to be exchanged, each division sends the information to the other three divisions and to its own data processor. The incoming data from the other divisions are stored in buffer memories 224 (FIG. 3) (to accommodate the asynchronous operation of each division) prior to being evaluated for the trip function. The buffer memories accommodate the division's own information. The four data readings are then ready to be processed and voted upon for the determination of the need for a divisional scram command output.

Software Logic Operation

Figure 6:
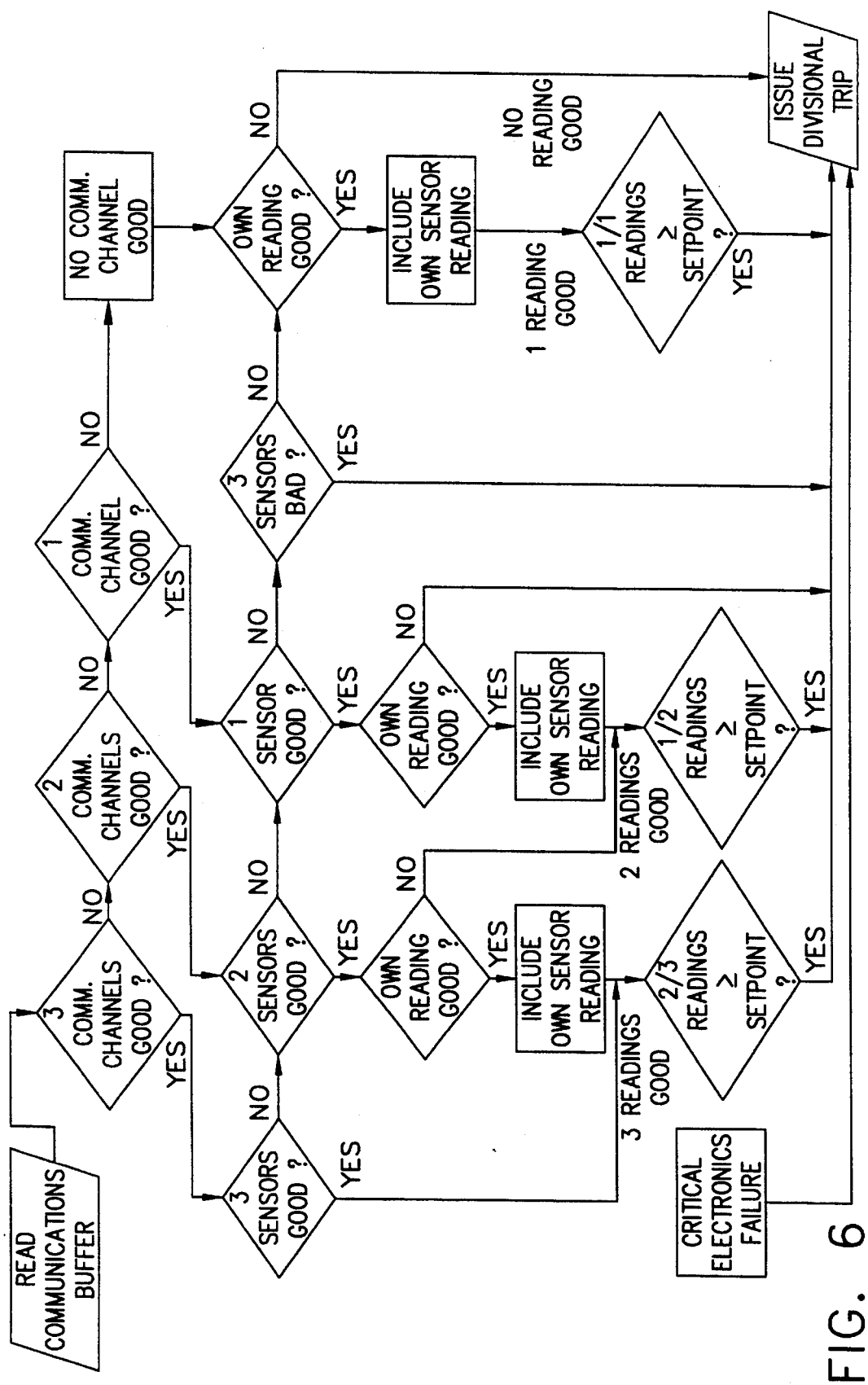
FIG. 6 is a flowchart of the RPS trip logic for one division in accordance with a preferred embodiment of the invention.

According to the inter-divisional data communications described above, the data word formed by each division is automatically sent to all the other divisions. Thus, each division has all four sensor readings and flags (contained in four "identical" data words) to work with for each polled observation. As each word is received by a division it is stored in a buffer memory 224, and then recalled and tested to see if the sensor reading is good as determined by the status of the sensor verification flags (block 226 in FIG. 3). If verified, the sensor readings are checked against each other for uniformity. Then the sensor readings are passed through for any necessary calculations (block 228) and software voting (block 236) (see FIG. 6). Computed parameters such as rate of change and ratio require additional calculation steps (added software routines but no additional hardware).

If one or two successive readings of a given division's sensor are "out-of-spec" the readings are ignored and the division substitutes its own data. However, if information from one division continues to be erroneous or drift away from the sensor readings of other division sensors, or is missing repeatedly, an error message (call for service) is issued.

After all scram parameters are calculated, they are compared to a safety set point. If 2 out of 3 exceed the set point for any parameter, a scram signal is issued from that division (block 238 in FIG. 3), actuating its 2/4 hardware logic relays. If two or more divisions issue scram signals, a reactor scram will occur.

Hardware Scram Logic

The RPS uses hardware logic 6 to perform a two out of four division vote on the need for a scram. Any two RPS divisions issuing a trip command results in the initiation of a scram sequence. Each actuator 36 has one set of hardware logic connected thereto. Two different types of hardware logic, series and parallel, are used. The series logic consists of switch contacts placed in a series/parallel arrangement such that any two divisional sets of contacts interrupt the flow of current through the actuator circuit. An example of this current interrupt hardware logic is the latch coil holding circuit (see FIG. 7A). In contrast, the parallel logic consists of switch contacts placed in a series/parallel arrangement such that any two divisional sets of contacts enable current to flow through the actuation circuit, a voltage make logic. An example of this hardware logic to energize and actuator is illustrated in FIG. 8A. In each of these configurations, all of the "A" contacts are physically located in the RPS Division A instrument vault; the "B" contacts are in the "B" vault, etc. (see FIG. 5).

Diagnostic Self Testing and Continuous Monitoring

Additional features of the RPS to enhance system availability include automatic, frequent self-testing, continuous diagnostic monitoring, and periodic divisional testing, sensor input through output relay actuation. The RPS automatically checks its own performance in two ways. First, it performs a limited test of the electronic components and circuits by injecting a reference voltage 201 as a sensor input and comparing measured response to predetermined values (see FIG. 3). The RPS also automatically performs a periodic, on-line, extended test of an entire division without manually bypassing the division and without resulting in an inadvertent scram. Testing is done from input to output, and includes actuation of the scram hardware logic circuit. All four divisions continually monitor the status of the 2/4 hardware logic components and use this information for test scheduling, confirmation of correct operation, and as a diagnostic to identify problems.

Active Limited Testing: Each sensor polling cycle includes sampling of a divisional reference voltage. The reference voltage 201 (see FIG. 3) is treated as a sensor input, sufficient to result in a scram decision. However, the actual output of a scram command is inhibited. The response to this test voltage is diagnostically evaluated for evidence of erroneous performance by a division and, when compared to the input from other divisions, for detection of system performance, reference voltage error, and/or cross communication degradation. If any portion of the system is not performing correctly, the defective item is automatically identified to the smallest replaceable module, and service is automatically summoned. This electronic component test is designed to take place continuously, on-line, by automatic piecewise testing. A normal scram inhibit command continues to be output to the division's hardware logic such that a "half scram" condition is prevented during a limited test. A limited test is performed with each sensor polling cycle. [The reference voltage is polled as if it were a sensor input.] Thus the limited test is "piecewise" continuous. Any problems detected result in a message being output to request timely service.

Because all digitized sensor and reference input voltage readings are exchanged and compared by all divisions, systematic errors are rapidly detected. This includes errors with individual sensor or reference voltage readings, the input data processing, and cross communications. Each division sensing a problem of its own or of another division, will output a call for maintenance, thus assuring prompt fault detection and notification.

Extended Testing: The extended test is designed to evaluate the state-of-health of an entire division, sensor input through output hardware logic. The extended test is the same as a limited test without the inhibited scram output. Thus, the extended test results in actuation of a division's output scram relays. This test is performed by only one division at a time, only if no other division is likewise testing, and only if all divisions appear to be functioning correctly. A division scheduled to conduct a test will first check to see if everything is normal. If not, it will wait for a random amount of time, then try again later. The monitoring of the 2/4 hardware logic by all divisions is used to assure that two divisions do not perform the test simultaneously and cause an inadvertent scram.

To perform this extended periodic test, the limited test is extended by allowing the testing division to issue a scram command to actuate its 2/4 hardware logic components. During the few milliseconds required for the extended test, two of the three active divisions are still required to command a scram before a shutdown sequence is actually initiated. This shields "half scram" condition problems which would occur with a conventional protection system when the testing division sends out a test "scram" signal to the hardware logic. In a half-scram condition, one division's scram relays are opened so that scram from any one of the other divisions results in reactor scram. This is the only time in the testing that the system is in the "half scram" condition. The time for this test segment is equivalent to a normal sensor read period so the chance of inadvertent scram due to simultaneous testing by another division is small. In addition, all divisions are software scheduled for testing based upon their monitoring of test activities of other divisions.

Reconfiguration of hardware logic (to 2/3 logic) during division testing and maintenance is commonly done in conventional RPS designs. The key difference is that conventional protection system designs use manual bypass to conduct these tests whereas the RPS of the present invention continues to require 2/3 sensors to indicate a need for scram and is therefore less prone to inadvertent operational and maintenance errors and does not require bypassing.

An extended test is not conducted if any of the four divisions is operating in an off-normal condition. For example, the extended test does not occur during a full division maintenance operation, when the division CPU, power, or digital output cards are inoperative. This puts the full hardware logic into a "half scram" condition. Yet the software logic screen still requires two out of three sensor readings to indicate the need for scram before a scram command is issued. This greatly reduces the chance of inadvertent scrams. Present estimates show that the inadvertent scram probability is acceptably low.

Figure 7A:
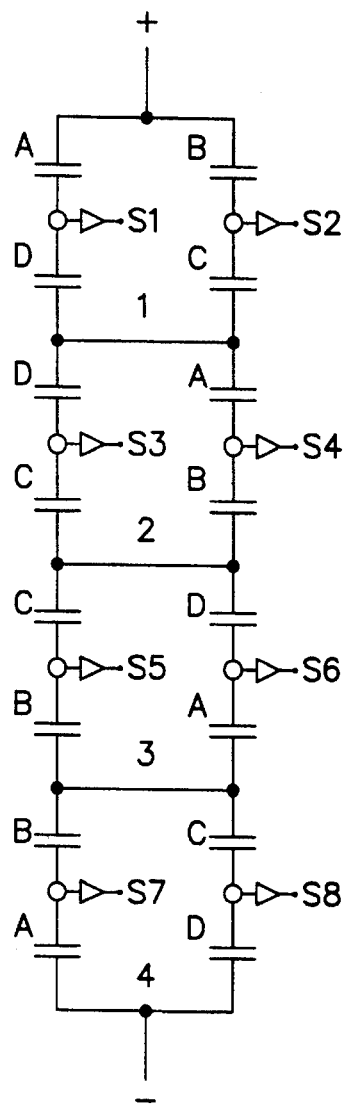
FIG. 7A is a circuit diagram showing the switch contact electrical equivalent circuit for the current interruption hardware logic.
Figure 7B:
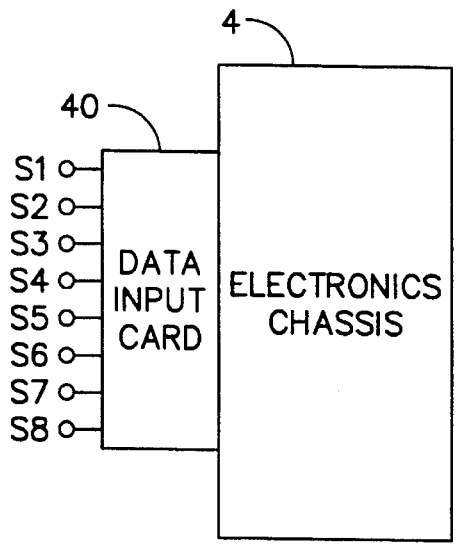
FIG. 7B is a block diagram showing the input of sensor output data to a CPU for diagnostic testing of the hardware logic shown in FIG. 7A.
Figure 7C:
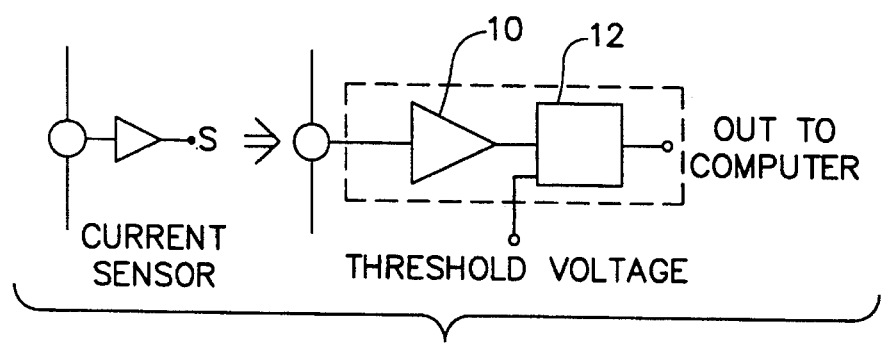
FIG. 7C is a circuit diagram of the current sensor incorporated in the hardware logic shown in FIG. 7A.

The results of a division's extended test are monitored by all divisions by the continuous monitoring of the hardware logic relay contacts (see FIGS. 7 and 8). Each division looks for any contact pair change of state and correct operation. This capability is based upon monitoring the current or voltage at different points throughout the hardware logic circuits. The state of the contacts (with relays actively powered) is continuously monitored during normal operation as an additional digital sensor input. This provides a failure (change of contact state: open to close, or close to open, or failure to change state, depending upon the logic configuration) detection capability during normal operation as well as during testing. The divisional testing feature (either manually requested or computer scheduled) actually operates the relays without causing a scram. Diagnostic sensing confirms the correct operation of the relay contacts or identifies and reports the failure to operate correctly. Each division is able to use the information gathered to assess the health and status of all other divisions. The conduct of the extended test helps to assure that the data processing algorithms, set point comparisons and scram output circuits are functioning properly.

The present invention provides an automatic test capability to assure that the 2/4 hardware logic relay contacts are operating correctly and ready to respond to a scram demand. The test is performed periodically in the automatic mode or immediately, in response to a manually input keyboard demand for test. Testing must not cause a scram. Testing opens or closes the 2/4 relays contacts to interrupt or establish flow of current through the contacts. An automatic or manually input keyboard demand for test will not be executed if another division is performing a self test, is out of service for any reason or in the presence of any off-normal indication from the 2/4 logic circuits.

Referring to FIG. 7A, under normal circumstances, relay contacts are held closed by the application of a control voltage from each division of the RPS. Testing will open only one divisional set of contacts (four for each division) at a time. No two divisions will test at the same time. Testing will be suspended if one division is out of service. The electrical current through the 2/4 logic circuit normally will divide nearly equally between the two sides of the bridge arrangement. Under normal circumstances, no current will flow through the three crossover paths. Current will flow through these crossover paths depending upon the contact set opened during testing. Non-contact (for isolation) current sensors S1–S8 will be arranged between pairs of contacts as illustrated in FIG. 7A. The sensed current is measured and converted to an analog voltage by amplifier 10. The amplified voltage is fed to a comparator 12. The comparator tests the input voltage against a reference voltage. If the input voltage exceeds the reference, a digital one value is output. If not, a digital zero is output. For example, when the signal is sent to open contacts A during testing, sensors S1, S4, S6 and S7 should go low, while sensors S2, S3, S5 and S8 remain high. Any deviation from these sensor outputs indicates that one or more of the A contacts failed to open. The faulty contact can be easily identified from the unique 8-bit (or any number of bits depending upon the number of diagnostic points sensed) code produced from the sensor outputs.

The digital output from each of the eight sensors for each hardware logic train are input, in parallel, to an 8-bit data input card 40 (see FIGS. 3 and 7B) plugged into the electronics chassis 4 for each RPS division. The digital I/O output from all eight sensors forms a unique 8-bit digital word for each correct or faulty operation of the 2/4 hardware logic relays. That word is processed by the CPU on the electronics chassis 4. Monitoring of the diagnostic, digital input port will permit each division to recognize that another division is conducting a test or is out of service and be able to report the results of each test. If a division is scheduled to conduct a test, it will query its diagnostic, digital input port. If the port is busy, the division will wait a random amount of time, then try again. Retries after a random wait will continue until such time that the digital input port is clear. (This assures no testing while one division is out of service and automatic resumption of testing without need for manual restart when the port is clear.) Testing will then consist of the division issuing a scram command to its relays. The division will read the diagnostic, digital input port. If the returned sensor pattern is correct, the test is successful and the division's display will show that the test was conducted and passed. If the pattern is incorrect, the CPU will be able to identify which hardware element failed and output an appropriate message.

In the case of the hardware logic relay contacts shown in FIG. 8A, high-value resistors 14 are arranged in parallel with contacts (see FIG. 8B). An isolated analog amplifier 16 measures the voltage drop across each resistor. The amplified voltage is fed to a comparator 18. The comparator tests the input voltage against a threshold voltage. If the input voltage exceeds the threshold, a digital one value is output. If not, a digital zero is output. For example, when the signal is sent to close contacts A during testing, sensors S1, S4, S6 and S8 should go low, while sensors S2, S3, S5 and S7 remain high. Any deviation from these sensor outputs indicates that one or more of the A contacts failed to close. The faulty contact can be easily identified from the unique 8-bit code produced from the sensor outputs.

The digital output from each of the eight sensors for each hardware logic train are input, in parallel, to the 8-bit data input card 40 for each RPS divisional computer (see FIG. 7B). The digital I/O output from all eight sensors forms a unique 8-bit digital word for each correct or faulty operation of the 2/4 hardware logic relays, which is monitored as described above.

Upon completion of the test, the division will resume normal monitoring and protective service. The automatic testing, limited and extended, the exchange and comparison of sensor and reference readings, and the diagnostic monitoring replace the need for human surveillance testing, thus reducing a major cause of unintentioned scrams.

Environmental and Maintenance Capability

The RPS electronics are designed to operate at elevated temperatures (approximately 170° F.) without the need for active cooling or heating, ventilation, and air conditioning (HVAC) systems. A division may be serviced, on-line, at any time without causing a reactor trip. The RPS is designed as a highly modularized system and may be functionally updated as technology progresses to satisfy the 60-year life requirement. Diagnostics to locate problems to the smallest, plug-in, replaceable modules are provided. This means that the system can be easily and rapidly maintained by minimally skilled technicians. The RPS electronic modules (e.g., CPUs, signal conditioning cards and data input cards, all plugged into the electronics chassis 4) for all four divisions and all reactors are identical, resulting in a reduced stock of spare parts required to maintain the system.

RPS Electrical Power

Figure 9:
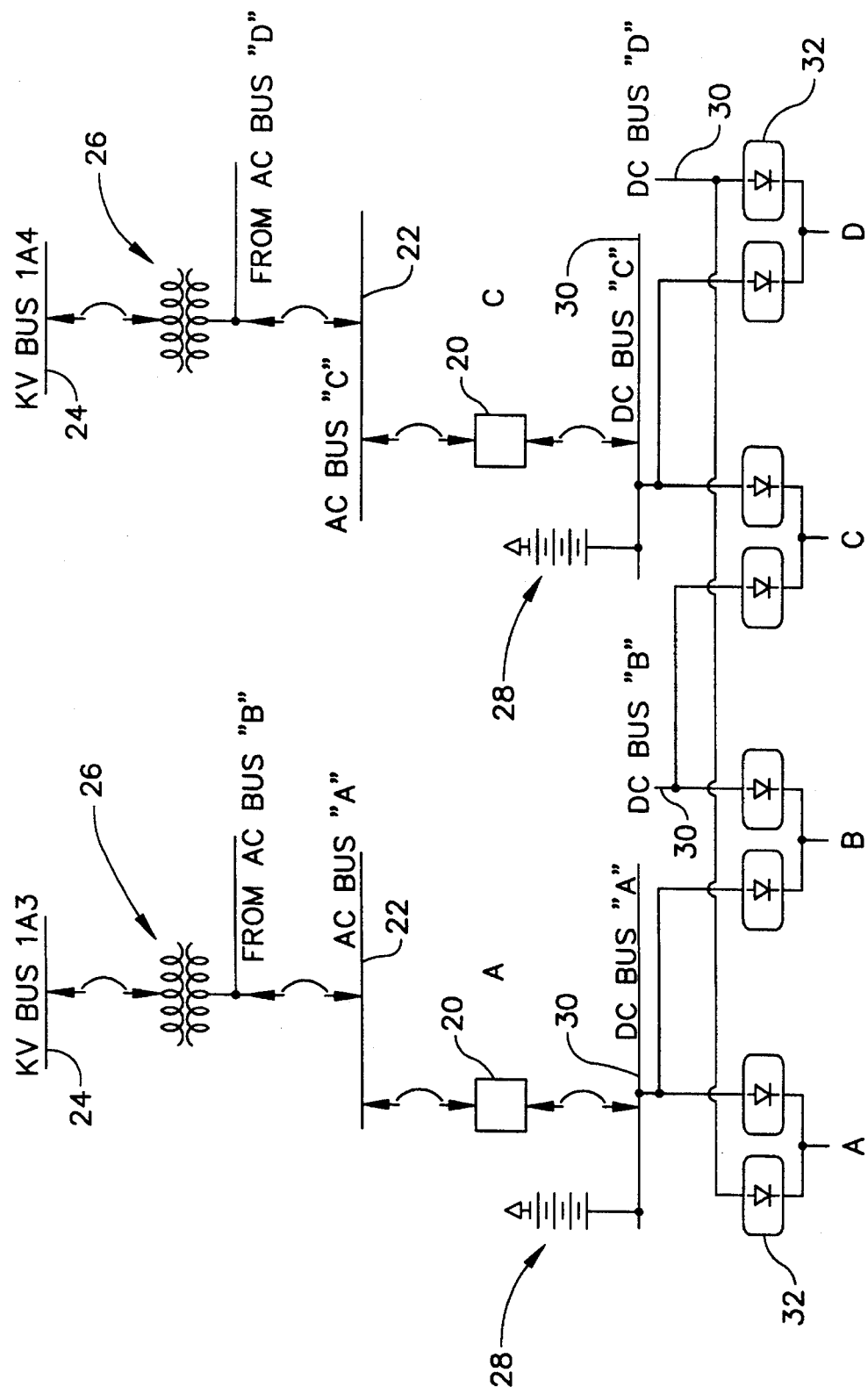
FIG. 9 is a single line diagram showing a typical electrical power distribution for the RPS instrumentation electronics in accordance with the invention.

Typical electrical power distribution for the RPS instrumentation electronics is illustrated in FIG. 9, which illustrates the single line diagram for only two RPS instrument vaults. The other two division vaults are supplied electrical power in a similar fashion but with origins from two different high-voltage busses.

All RPS instrumentation is operated by direct current (dc) voltage. Each division of the RPS is supplied battery-backed, dc electrical power from two parallel, electrically isolated, dc sources (located in two different RPS division vaults) via dc busses 30 and isolation devices (e.g., diodes) 32.

Battery chargers 20 in each vault serve as qualifiable electrical isolation devices. Each alternating current (ac) bus 22 is supplied from two different sources. Each of the ac busses is sourced from either of two high-voltage ac busses for added reliability and availability.

Facility power is distributed throughout the plant as alternating current (ac) at a kilovolt level via busses 24. A step-down transformer(s) 26 reduces the ac voltage level and supplies the battery charger 20. The battery charger outputs a dc voltage for the RPS division load and to maintain the charge on a battery 28. Normally an RPS division takes its power from the battery charger. However, should the facility input ac power source fail, an RPS division is supplied continuing power from the battery. No switching or dc to ac inversion is involved, thus simplifying the system and eliminating additional component failure potential.

RPS Scram Logic Operation with Failures

The RPS is designed to ensure that: (1) no single failure results in loss of the protection function and (2) removal from service of any component or channel does not result in loss of the required protection function. It is also designed to minimize false (inadvertent) scrams due to sensor malfunctions without compromising safety.

Normally, with four good sensors and all electronics and communication systems operational (see FIG. 10), RPS divisional trips are based on a 2/3 division sensor data vote with each division keeping its own sensor reading as spare. However, this trip logic is different if failures occur either in the sensors, processing electronics, or communications.

Figure 10:
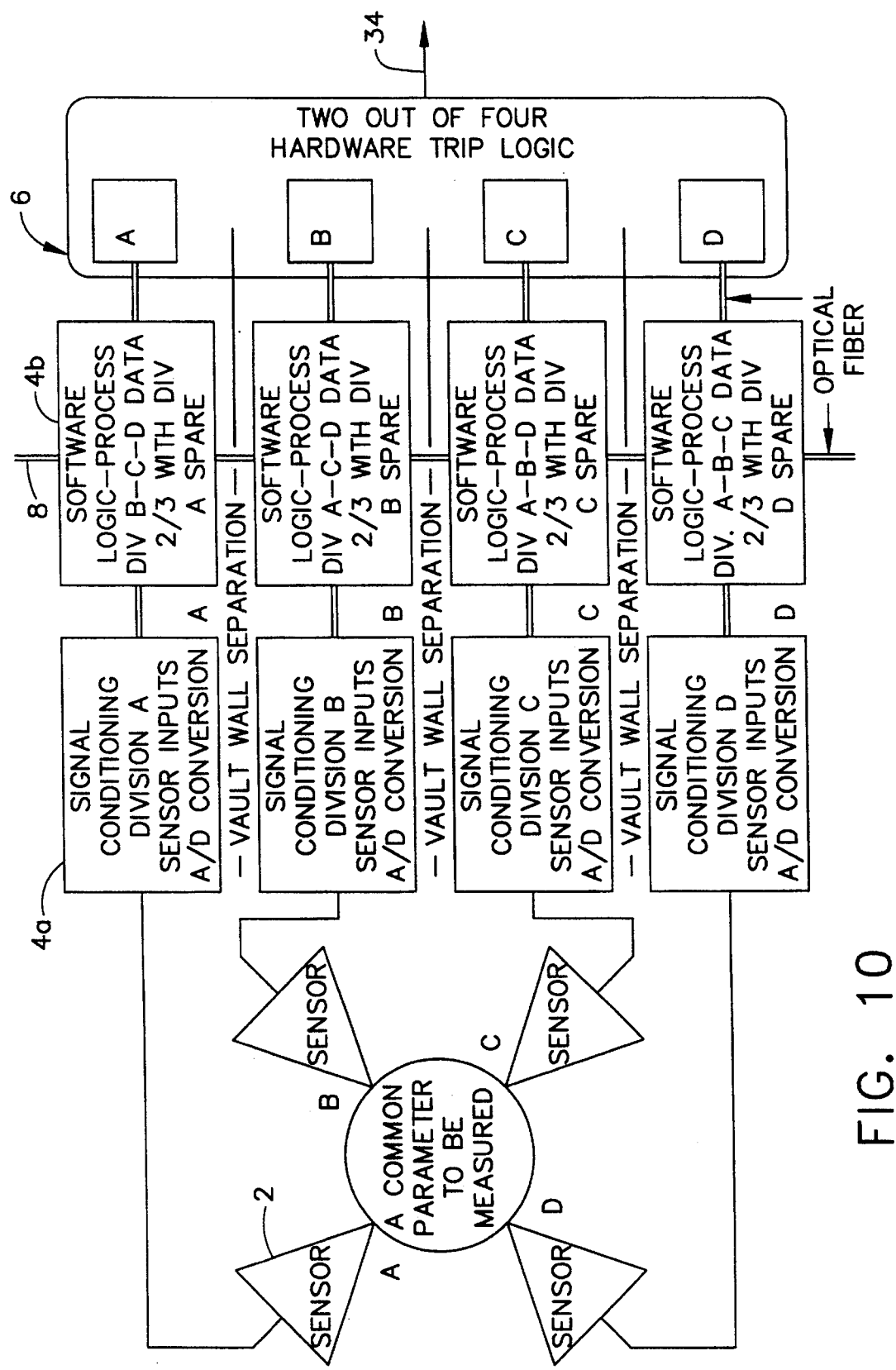
FIG. 10 is a block diagram of the reactor protection system component logic in accordance with the present invention.

In the case of a failed sensor with operational electronics and communications, the sensor fault produces sensor readings which are outside the reasonability bands, and are easily detected by noting the status of the sensor verification flags. Bad sensor readings are not used in the scram vote. For example, if sensor B shown in FIG. 10 is bad, then the 2/3 software logic 4b for each of divisions A, C and D substitutes its own sensor reading as needed (so that each division still has three good readings from sensors A, C and D) and performs the 2/3 scram vote. The software logic for division B performs its 2/3 scram vote using the normal sensor readings (from divisions A, C and D). If two sensors are bad, then each division has two good sensor readings and issues a scram signal if either or both sensors say scram (i.e., it performs a 1/2 vote). If all three (or four) sensors are bad, then each division issues a scram command. The hardware logic 6 issues a signal to the operator if two out of four divisions issue a trip signal.

Alternatively, it is possible to have failed electronics accompanied by correctly functioning sensor and communications. Electronics failures include failures in key signal processing chips (signal conditioning circuit 4a in FIG. 10) in the microprocessor-based chassis 4 or failures of the systems supplying power to the chassis. Such electronic failures prevent the division output circuitry from sending the divisional "no scram" signal and that automatically puts the division in a "scram" condition, regardless of the sensor and communication system status. Thus two (or more) such electronic (CPU) failures will trigger scram regardless of whether any of the sensors are indicating scram (Failsafe). This is equivalent to what is done in conventional RPS systems.

Thirdly, it is possible to have failed communications with operational sensors and electronics. Communications failures include failures in the inter-processor communication system due to either hardware/software problems in the sending or receiving units, or noise pick-up during transmission. Such communication failures are not serious, and are detected by absence of incoming communicated sensor data. If one such failure occurs, such that a division receives data from only two instead of three other divisions, it substitutes its own data and does a ⅔ vote with no loss of reliability for the protective function. If a division receives data from only one of the other three divisions, it substitutes its own data to give two good readings and votes scram if either is above the trip setting (i.e., it does a ½ vote). If a division receives no data from any of the other divisions, then it uses its own data and issues a divisional scram with ¹⁄₁ logic, as in conventional RPS designs. Thus with a total communication failure, where no division sends or receives data from any other division, the RPS acts like a conventional RPS without inter-processor communication.

Under normal conditions, two correctly functioning sensors must call for a trip before a trip is issued. This is consistent with the 2 out of 3 plus spare software logic of the RPS electronics and the 2 out of 4 hardware logic of the RPS scram breakers. Unlike conventional systems, the two-sensor trip requirement continues to hold even if one sensor is not functioning correctly and one different division of the RPS logic is out of service. This shielding of RPS from sensor faults decreases inadvertent scrams and provides a high degree of confidence that any trip issued is for cause as indicated by sensor input.

When applied to a nuclear reactor, the RPS functions are to: (1) continuously monitor the safety parameters in the reactor (neutron flux, cold pool and core outlet temperatures, pump discharge pressure, and primary sodium level); (2) determine if reactor shutdown, EM pump trip, and containment isolation are needed; (3) send a trip signal to the control rod release mechanisms and drive-in motors to ensure insertion of the control rods; (4) initiate coastdown of the primary EM pumps; and (5) initiate containment isolation through IHTS valve closure and containment ventilation valve closure.

The RPS has four identical, parallel logic trains or divisions to perform these functions. Each logic train consists of a sensor, analog input/amplifier/digital converter, digital logic unit, and trip actuator. Seven parameters are used for reactor trips. Each logic train has one sensor input for each parameter. A polling of the analog inputs is performed and that determines which parameter is processed by the RPS at any instant of time.

Several levels of diagnostics are performed automatically by the RPS at differing intervals. These levels include: individual component calibration, checking of subsystem calibration/wellness, overall system performance, signal verification and validation, data exchange validation, and trip validation.

The four RPS divisions work together as a fault-tolerant system, that is, any failure that occurs within any division is detected and confined. Reconfiguration occurs automatically to bypass a problem area. The system is capable of being repaired while operating. One entire division may be removed for service at any time without system degradation. The inputs are fully fault tolerant, that is, if a failure occurs within an input section, the failure is isolated and the system is reconfigured around the failure. Each of the four central processing logic units is capable of error detection, containment, and reconfiguration. Each optically coupled circuit breaker is provided with a test feature such that the complete division may be automatically tested (from sensor input through to, and including, the trip breakers) at any time without the release of a control rod or initiating a reactor scram.

Figure 11:
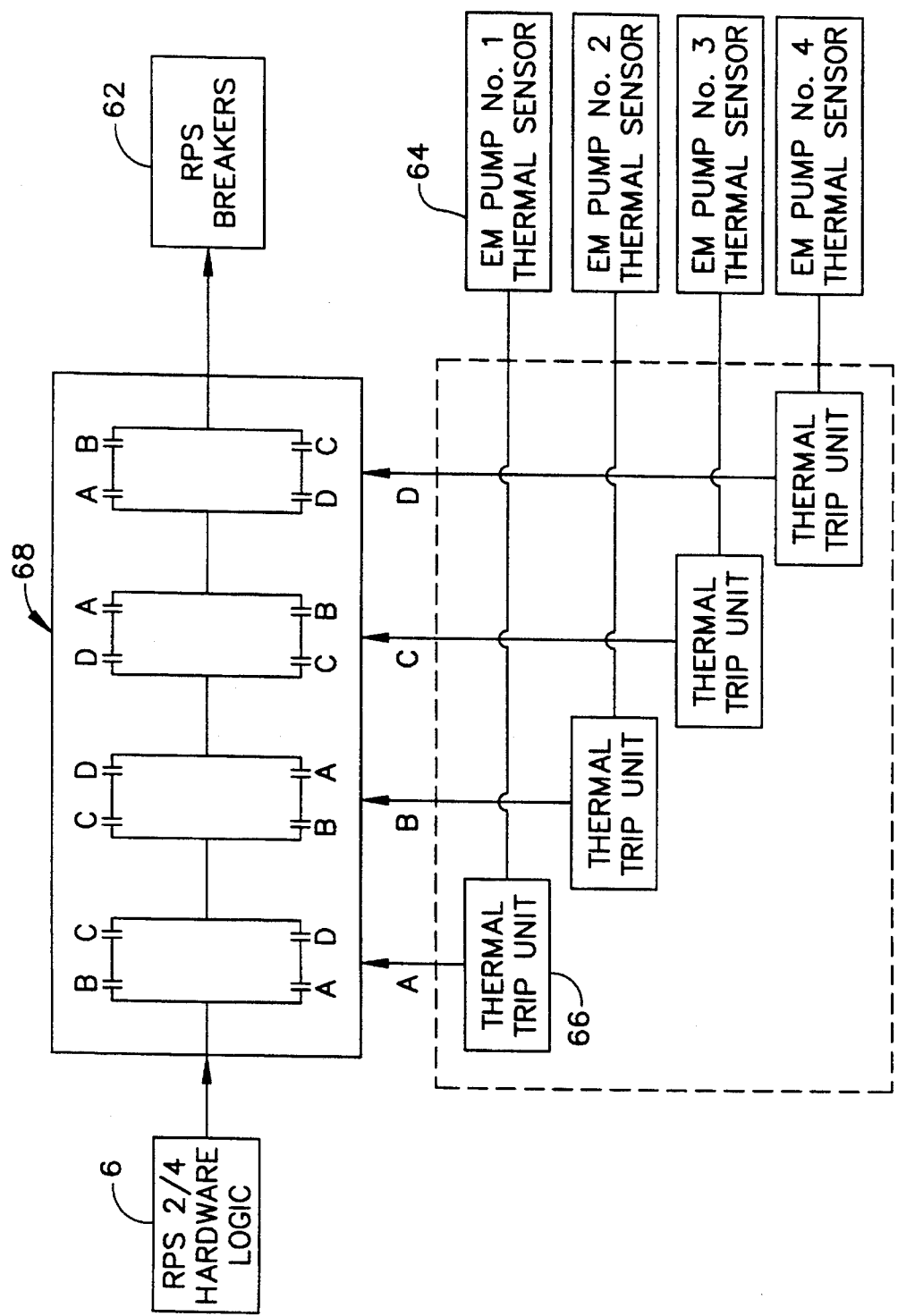
FIG. 11 is a block diagram of a thermal shutdown system used in conjunction with the reactor protection system of the present invention.

RPS Operation: If a design basis event occurs and any of the reactor trip parameters exceed their safety set points, the RPS electronics 4 automatically initiates a scram sequence (see FIG. 2). The reactor scram sequence begins by controlling ¾ hardware logic 6 to interrupt the power to the latch coil holding circuits 102 which hold control elements 106 and to apply power to the drive-in motors 104, and by sending a message to the PCS 56 indicating that a reactor trip is in progress. Upon confirmation of scram (a flux decrease), the power to the electromagnetic pump 108 from EM pump power unit 110 is disconnected by controlling ¾ hardware logic 6, which in turn trips RPS-EM pump breakers 62 (there are two breakers for each of the three EM pump phases), thereby initiating primary flow coastdown. The EM pump shutoff action does not occur until there is a confirmation that control element 106 has been inserted. When the scram command is initially issued, the measured flux at that instant is noted. The flux level is re-checked and the EM pump shutoff action is not allowed to occur until the flux has decreased by a preset percentage from its scram initiation level. If the control rods 106 should fail to insert, this confirmation logic will allow the reactor to heat up until the passive shutdown features decrease the flux by the specified percentage and then the Thermal Shutoff System (TSS) will initiate EM pump shutoff and flow coastdown will occur. As seen in FIG. 11, the TSS comprises four thermal sensors 64 connected to ¾ current interruption hardware logic via four thermal trip units 66 respectively. Each thermal sensor 64 provides an independent sensor reading of the EM pump temperature.

Release of the control rods 106 occurs within 50 msec of a decision to issue a trip command. Gravitational insertion of the rods is completed within 2 sec. Gravitational insertion is backed by a drive-in motor powered control element insertion. The drive-in motor 104 ensures complete rod insertion within 18 sec. After scram, the reactor power decreases to less than 10% within about 2 to 3 sec. The EM pump coastdown then ensures that the primary flow is reduced to a near natural circulation level over a 200-sec period of time.

The mixed core outlet temperature drops rapidly, then gradually increases, peaking at about 500 sec, then gradually decreases as the reactor 100 continues to cool. The flow coast-down curve consists of a sharp drop in coolant flow from 100% to about 85% as soon as the power is disconnected from the EM pump 108, and then a gradual flow decrease for the next few hundred seconds as the synchronous machine 112 delivers its energy to the EM pump and flow slows down.

All operation of the RPS is automated. There is no requirement for operator safety action at any time. However, manual scram can be initiated either locally or remotely to prevent challenges to the inherent safety features. The RPS accepts a manually input request to execute a trip sequence from its own scram buttons (an action that bypasses all electronics and interrupts power to the trip breakers directly). Manual scram may also be initiated through diverse non-safety-related electronics via an operator's console 72 in the main control room 74 (FIG. 2). The first method is via the DHTS to the RPS controllers, and the diverse method is via direct connection to the manual scram actuation electronics. Further, a safety-related, manually input scram command may be input to the RPS from the scram buttons located on the face of the console 76 in the remote shutdown facility 78. Once a reactor scram sequence is complete, operator action is required to initiate scram recovery, determine the cause of the scram, and restart the reactor if all is nominal.

In addition to the reactor scram function (including EM pump shutoff), the RPS also performs three additional functions: (1) provide data and displays for post-accident monitoring (PAM); (2) close the Intermediate Heat Transport System (IHTS) isolation valves 116 via IHTS valve controller 118 when a large steam generator sodium-water reaction occurs (see FIG. 13); and (3) close containment ventilation valves 120 when radiation in the containment dome and air containment effluent becomes too high (see FIG. 13).

In case of a major steam generator sodium-water reaction, the RPS prevents reactor damage by closing the IHTS isolation valves 116 which isolate the intermediate heat exchanger (IHX) 117. The sodium-water reaction event is sensed by the RPS pressure sensors F (FIG. 4) located in the IHTS loop, which trigger both closure of the isolation valves and reactor scram. The containment ventilation valves 120 are closed by the RPS removal of power to normally open RPS breakers 88 in series with the PCS-controlled breakers 90 which connect facility power 132 to the ventilation valves 120 (see FIG. 12). The scram function is independent of the containment isolation function. Most scram events (those caused by events within the reactor) do not trigger IHTS or containment valve closures.

Figure 12:
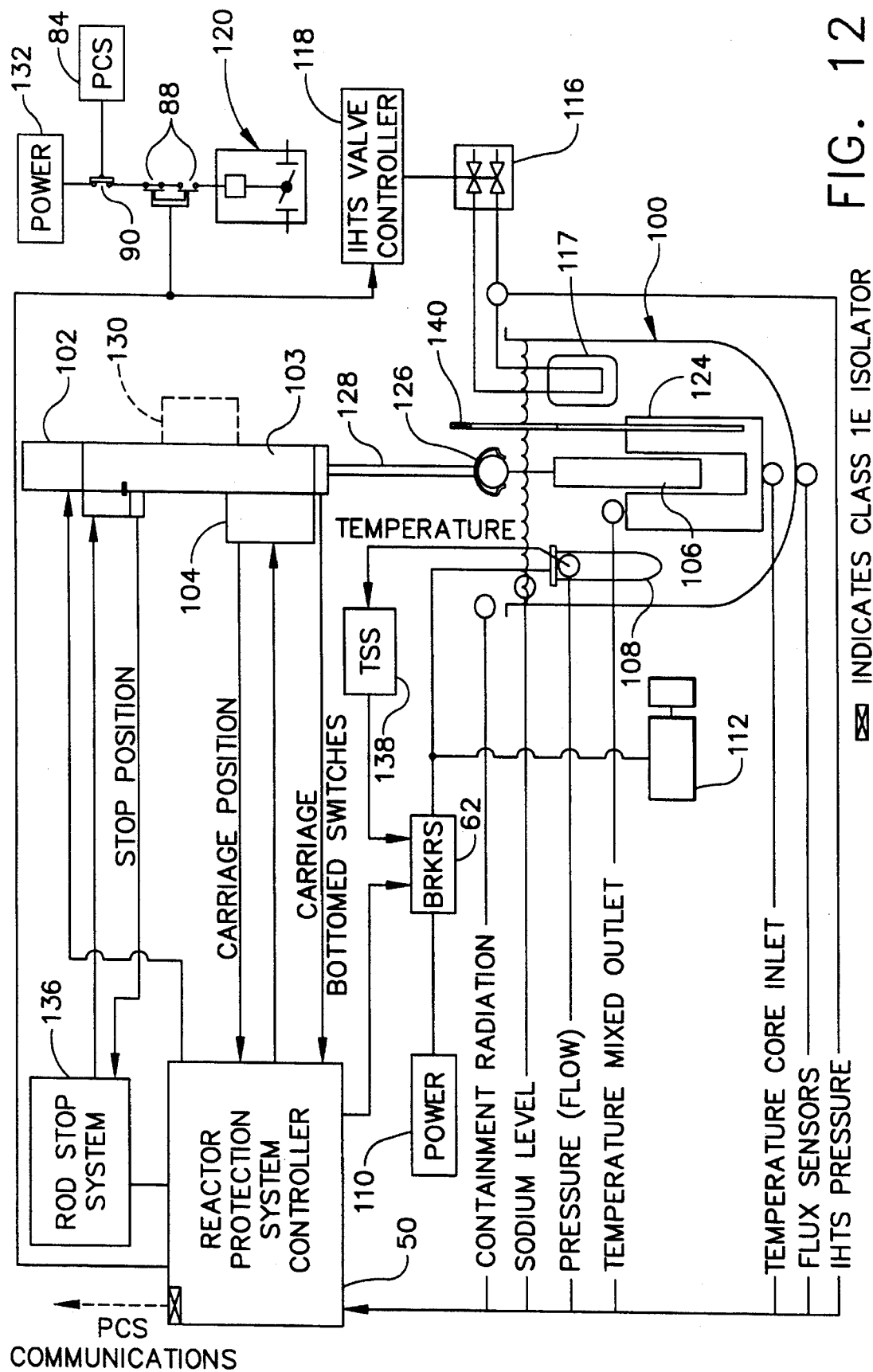
FIG. 12 is a block diagram showing the inputs and outputs of the reactor protection system in accordance with the preferred embodiment of the invention as applied to a liquid metal reactor.

Scram Control Rods: An RPS scram command results in the release of neutron absorber material (the lower part 106 of the control rod assembly contains the absorber material) into the reactor core 124. Typical control rod system elements are shown in FIG. 12.

The control assemblies are used by the Plant Control System (PCS) to adjust the operating power level of the reactor module. The absorber bundle 106 is held at the top of its rod-like structure by a collet (latch) 126. The collet 126 is connected by a rod 128 to the control rod drive mechanism where a pair of continuously energized electromagnets (latch coils) 102 hold the collet 126 closed. An interruption of the electrical current to the latch coils 102 (a trip) opens the collet 126, releasing the absorber bundle 106, which allows it to drop into the core 124 under its own weight (gravity-assisted insertion).

Each control assembly has two motors to control the positioning of the absorber bundle. A shim stepping motor 130 is provided such that the PCS can make major or vernier adjustments to raise or lower each absorber bundle 106 for controlling the power of the reactor. A unidirectional (in only) dc drive-in motor 104 (four times more powerful than the shim motor 130), when activated by the RPS as part of a scram sequence, drives each control assembly driveline to the bottom of its stroke to assure complete insertion of the absorber material. The RPS has no control rod withdrawal capability. [This is typical of the present invention, wherein the RPS operates DC motion devices in the safe direction or safe action only. Withdrawing or resetting of these devices must be done by another system such as the PCS.] Each control rod carriage 106 has limit switches that turn off the drive-in motor power at the end of the control assembly insertion. Activation of these limit switches is recognized as confirmation that the control assembly insertion is complete.

Initiate EM Pump Coastdown: In addition to control rod insertion, the RPS also shuts off power to the EM pump 108 (after confirmation of rod insertion) as part of the scram sequence. The RPS confirms rod insertion by noting that the flux level has decreased by a predetermined percentage, and then issues the command for EM pump shutoff. For this actuation, the RPS opens breakers between the PCS power conditioning unit 110 and the EM pump 108/synchronous machine 112. This disconnects the EM pump/synchronous machine from its normal power source. The EM pump 108 uses inertial energy stored in a flywheel connected to the synchronous machine 112 (self-excited) to provide coastdown flow. A separate Thermal Shutoff System (TSS) 65 is provided which opens the RPS breakers 62 and shuts off the power to the EM pumps 108 if the temperature of the pump sodium exceeds a predetermined value. This provides primary pump shutoff for ATWS events when the RPS has failed. FIG. 11 is a simplified single line diagram showing the EM pump power circuit and the PCS, RPS, and TSS interfaces.

Figure 13:
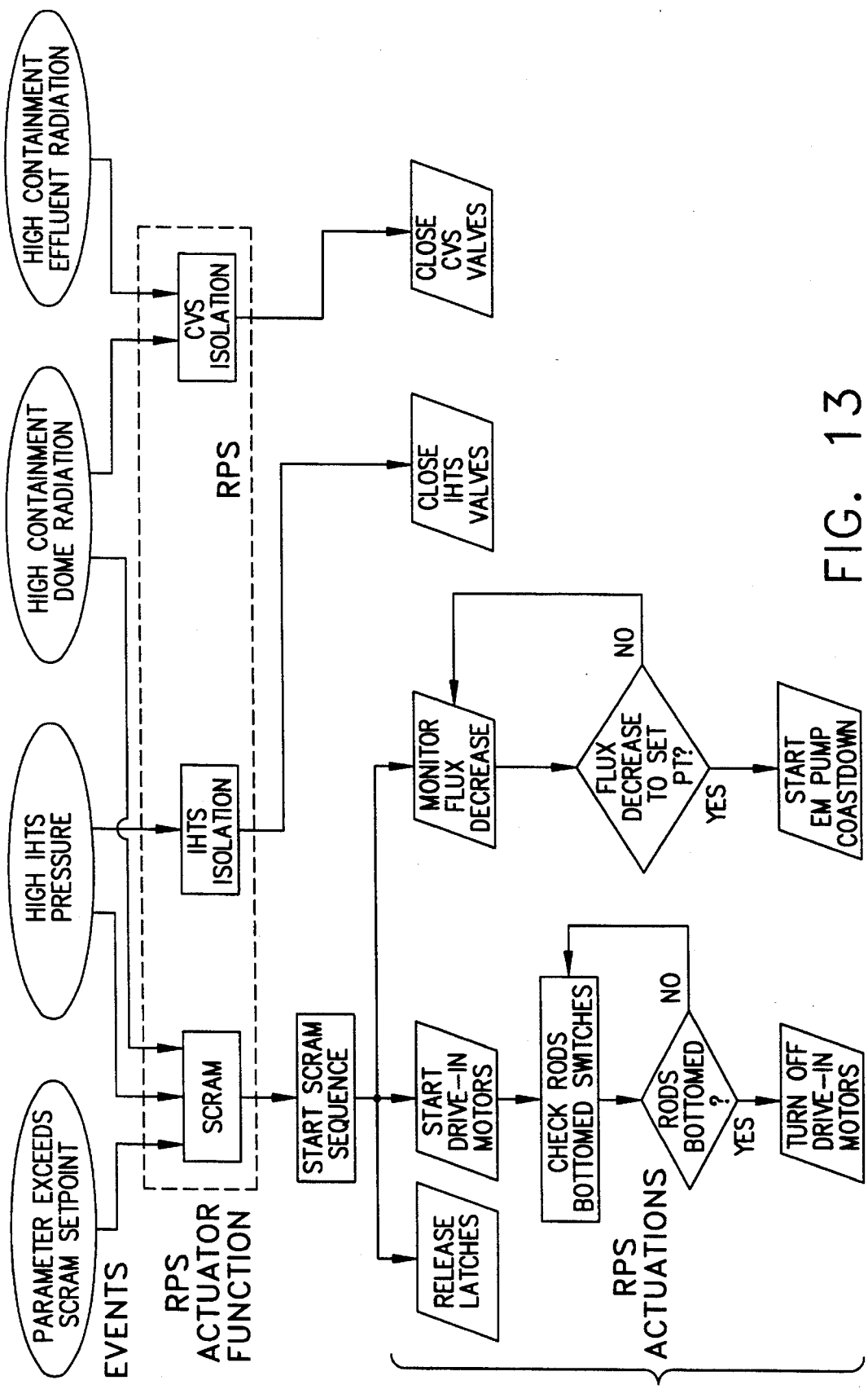
FIG. 13 is a flowchart showing the response of the reactor protection system when various parameters exceed respective thresholds.

Isolate Secondary Sodium System and Containment Ventilation System: The RPS is responsible for automatic containment ventilation and IHTS isolation valve closure for events that challenge containment. Conceptual designs for these functions are shown in FIG. 13. Closure of the IHTS valves 116 is achieved by closing RPS-controlled solenoid valves in the line that delivers pneumatic power to the IHTS valves. Closure of the containment ventilation valves 120 is achieved by opening RPS-controlled breakers 88 in the valve electrical power line 132.

Normally the IHTS valves 116 (four total, two in the cold and two in the hot IHTS lines) are open when the reactor is operating to allow IHTS flow. These valves are only shut in the remote event that a sodium-water reaction causes a high-pressure condition in the IHTS lines. The closure is automatic and done by the RPS controller 50 only. The PCS 84 has no capability to close the valves 116. This prevents the control room operators from inadvertently closing the valves when the reactor is operating. Further, the RPS has no capability to open the valves. The PCS cannot open the valves unless the reactor has scrammed and the RPS has transitioned to the Shutdown/Maintenance mode. Once in this mode, the valves can be opened (in order to start secondary sodium flow before startup) by PCS command from the control room. For service and test purposes, the valves may be manually opened and closed from a local pneumatic control panel near the valves when the reactor is shutdown and the RPS is in the Shutdown/Maintenance mode.

Normally, the containment ventilation valves 120 (four total, two in the intake and two at the exhaust) are closed when the reactor is operating. The only time that these valves need to be opened during operation is to freshen the air so that operations personnel can enter the containment. After personnel leave the containment, the ventilation valves are again shut. Opening and closing of these valves under normal conditions is done manually either from a local panel near the containment entrance or from the maintenance room and/or control room, using PCS electronics. However, if high radiation is detected in the containment dome 114 (see FIG. 4) or effluent, the RPS automatically opens breakers 88 and closes valves 120, and the PCS cannot open the valves until the reactor has been shut down and the RPS has transitioned to the Shutdown/Maintenance mode. FIG. 13 illustrates containment ventilation valve control by the PCS and the RPS for normal and abnormal situations.

As shown in FIG. 12, three auxiliary safety systems, the rod stop system (RSS) 136, the thermal shutoff system (TSS) 138 and the ultimate shutdown system (USS) 140, have been incorporated into the liquid metal reactor design to provide margin to safety in the remote event that the RPS fails.

The RSS 138 electronically adjusts mechanical rod stops and limits the maximum reactivity addition potential of an unprotected transient overpower event. The RSS ensures a benign response to unprotected rod withdrawal events by passively limiting out-motion of the control rods by physical interference with carriage motion. The components in the rod stop system include a quad-redundant controller, a rod stop drive selector, and a limited capacity power supply which controls power to each of the six rod stop adjustment drive motors, one for each control rod. Absolute position sensors are used to determine control rod and stop positions. The rod stop system controller is separate from the RPS controller. The RSS obtains reactor power and absolute control rod position data from the redundant sensors through the RPS controller. The RSS is activated by operations only as required to adjust the rod stop position. The RSS controller, power breakers, power supply, stepper motor controller and distributor are located in the RPS electronics vaults 82 (FIG. 4) adjacent to the upper containment area.

The TSS 138 is designed to automatically shut-off the EM pumps on high temperature, in case the heat sink (IHTS) is lost (so that only RVACS cooling is available) and the RPS fails. For this scenario it is assumed that the loss-of-heat-sink event starts from full power and that neither the PCS nor the RPS can shut down the pumps. The temperature within the reactor rises rapidly and triggers the inherency mechanisms to bring the reactor to a hot standby level within about 30 hr if the EM pumps are not operating. However, if the EM pumps continue to operate, each EM pump adds heat to the reactor. If the EM pumps are not shut off, the reactor's integrated heat input will exceed the heat sink capability. Thus, there is a need for a mechanism to automatically turn the EM pumps off should the reactor temperature exceed a given threshold.

As seen in FIG. 2, the RPS 50 provides the control power for the RPS breakers 62 in the EM pump/synchronous machine power circuit. As part of a normal scram sequence, the RPS will release these breakers to initiate an EM pump coastdown of the primary flow. In normal operation, the RPS breakers 62 are actively held in the closed position such that the EM pump (108)/synchronous machine (112) receive electrical power from the power conditioning unit (110).

As seen in FIG. 11, the TSS 138 monitors the temperature of the exit sodium in each pump. It consists of four safety-related thermocouples 64 (one in each pump inlet plenum) each with a thermal trip unit 66. The sensors and trip units are separate from the RPS. If the temperature in a pump should rise above the predetermined set point, the thermal trip unit 66 associated with the pump issues a trip signal. The trip signal opens contacts 68 in the trip signal line from the RPS to the EM pump RPS breakers. The contacts are arranged such that a trip signal from any two of the four thermal trip units will result in opening the EM pump RPS breakers 62 for all four EM pumps. This will initiate a flow coastdown in all four pumps, and will terminate the thermal input by the EM pump power supply to the reactor.

Each EM pump contains one thermal sensor 64 connected to a thermal trip unit 66 located in one of the RPS instrument vaults 84 (FIG. 4). The thermal trip unit 66 consists of conventional signal conditioning electronics, a set point comparator, and output circuitry. Each thermal trip unit outputs a signal to four optically isolated relays, arranged to form a 2-out-of-4 hardware logic 68 with the relay contacts from the other three thermal trip units as shown in FIG. 4. As with the RPS, all of these relays are failsafe, that is, they require an active signal to keep the contacts closed. If there should be a multiple failure or loss of power, the contacts will open to initiate an EM pump coastdown.

The USS 140 provides for the shutdown of a reactor in the extremely unlikely, hypothetical condition that all other methods have failed. For the ultimate shutdown system to be required, the PCS must have failed to run in the control rods and the RPS must have failed to scram the control rods. If such failures occur, the negative reactivity feedback characteristics of the system will bring the reactor to a safe, stable condition at an elevated temperature. At this point the ultimate shutdown system can be actuated by the operator to bring the reactor to cold subcritical conditions. Operator manual action is required to initiate activation of the ultimate shutdown system from either the remote shutdown facility or the RPS vaults. The ultimate shutdown system consists of a container with a poison ($B_4C$ absorber balls) that is released into the reactor to bring it to cold shutdown. As seen in FIG. 4, the USS is activated from a pair of buttons located in a case on the wall of the RSF and also in the RPS vaults.

The reactor protection system (RPS) in accordance with the invention represents a design departure from traditional reactor protection systems. This system design meets or exceeds all stated goals and maximizes the availability that can be provided by the design of a protection system. Many features of the disclosed RPS separate this design from traditional systems, including the following:

(1) Interactive quad redundancy, including: four sensors per sensed variable, four independent divisions of electronics (typically separated into four individual instrument vaults), and four pairs of solid-state trip relays in each hardware output logic. Each division actively uses the other divisions' sensor readings in determining the need for trip.

(2) Controlled gain amplifiers wherein the gain setting is based on the sensor calibration factors, the sensed parameter safety setpoints, and the system voltage normalization requirements.

(3) Solid-state electronics, microprocessors, logic circuits, solid-state relays and load drivers, and fiber optic and hardwire signal transmission routes.

(4) Asynchronous sensor data exchange and evaluation of all sensor data by each RPS division. No file server (master/slave) or other common point of failure. Asynchronous operation assures independence of action by each of the four RPS divisions.

(5) Automatic spare data substitution for missing or faulty data values. Each division evaluates the other division's data, holding its own sensor readings as spare. Decisions are made based upon a 2-out-of-3 software logic. The division's own sensor value is automatically substituted for any non-verified, non-validated, missing or corrupted readings and the 2-out-of-3 logic processing continues. No manual actions are necessary to accommodate a missing or erroneous signal or to return to normal upon correction of an off-normal condition.

(6) Intelligent data processing and evaluation—beyond simple logic. The RPS is capable of evaluating like data between the divisions and of using selected data for trips based upon ratios between parameters, rate of change of a parameter, accounting specific events, averaging, and other computations as required.

(7) Data are processed as a normalized voltage value rather than being converted to engineering units, which requires a different processing algorithm for each parameter. Conversion to engineering units is done only for the Man-Machine Interface (MMI) as an off-line process. The MMI is not involved in the determination of the need for scram and performs on a non-interference basis.

(8) Only one trip set point for all parameters. Variations between sensors are accommodated as amplifier gain adjustment factors at the input.

(9) High-speed operation and sensor oversampling are used such that data averaging, statistical processing, and other computations may be employed to increase reliability and reduce spurious scrams.

(10) Automatic self-testing-sensor input through actual scram breaker activation automatic test and monitoring. A limited test, sensor input through scram decision (without a scram breaker activation) is performed at least once each sensor polling cycle. An extended test, sensor input through scram breaker activation, is performed once each four hours for each division. Because the Plant Control System receives all RPS sensor and diagnostic data, the PCS is able to do additional, detailed off-line diagnostic and trend analysis with failure prediction as the objective. This off-line analysis cannot interfere with the RPS safety function but can result in early fault detection and problem correction. In addition, the PCS analyzes all RPS data for early fault detection purposes.

Surveillance testing is frequent, on-line, and automatic. No manual actions are necessary. Diagnostics are available to identify problems down to the smallest exchangeable module.

Because of the automatic exchange of digitized sensor and reference readings, each division is able to compare its limited and extended testing with that of the other divisions. Likewise, all divisions are able to evaluate the test of one division and independently call for service should a problem be detected. This assures early detection of systematic errors that are not detectable if a division is limited to the observation only of its own parameters and performance.

Self-diagnostics and modular design permit maintenance and repair of most system failures within 4 hr with automatic restart after the maintenance operation is complete. All RPS repairs can be accomplished without need to shut the reactor down.

(11) The scram actuator contacts are monitored continuously as a normal sensor input for detection of any inadvertent change of state and to confirm a correct change of state in response to a test activation or output of an actual scram command. All contacts in the hardware logic are continuously monitored as a normal parameter. Any change of state during normal operation (a failure) is immediately sensed and a notice to maintenance is issued. If a scram command or sensor-input-through-trip-breaker test is issued, this monitoring function is able to confirm that the action is correctly performed or will immediately sense the failure to act and issue a failure notice. All breaker contacts in the hard-wired logic are continuously monitored, in-parallel by all four divisions.

(12) No bypasses, either manual or automatic, are required for normal operation, fault accommodation, testing, maintenance or repair operations. Almost all RPS test, maintenance and repair operations may be performed without the need to shut the entire system down. One division at a time may be taken off-line at any time. Restoration to on-line operation is fully automatic.

(13) There are three defined modes of operation with limited operator input/communications in each to reduce the chance of human error. These modes are Shutdown/Maintenance, Startup/Operate, and Scram.

(14) The RPS is active even in the Shutdown/Maintenance mode of operation, providing continued safety. Because of its interlocking design with other systems, primarily the PCS, the RPS must be functioning for most reactor refueling, test, maintenance, and repair operations.

The RPS performs an active role during all modes of reactor operation, including shutdown, maintenance and refueling. By interlocking control rod carriage functions, the RPS is able to prevent accidental control element withdrawal and unplanned reactor operation. The RPS also controls the EM pump breakers such that primary fluid pumping cannot occur unless the RPS is correctly operating. The RPS must be active to permit control rod carriage withdrawal for refueling operations, and must perform correctly to permit one control element at a time to be withdrawn for mandatory rod drop testing.

(15) The power sources for each division of the RPS electronics are dual, isolated, battery-backed dc power supplies with no dc-ac inverters and no switching involved in changing from facility power to battery power. The sources utilize both physical and electrical isolation such that the failure of one power system cannot cause the failure of the second. Independent, dual battery-backed actuator power sources, not shared by the RPS electronics, are provided for each scram breaker ⅔ logic train and its actuated safety device.

(16) Maximum electrical and physical isolation between components and divisions of the RPS are used to assure that no failure of one component can interfere with the overall operation of the RPS or the reactor.

(17) The RPS is quad redundant with each division of electronics and power physically separated into its own instrument vault. Maximum use of fiber optics is made for communications between the divisions. The extensive use of fiber optics provides a high degree of system and component isolation.

(18) All safety system electronics are located in the RPS instrument vaults. Only sensors and actuators are located within the containment and/or reactor. Analog and digital sensors are directly connected to the Data Acquisition Unit (DAU). There are no electronics within the reactor area, including the head access area and containment. Wherever possible, the interface between a sensor and its input electronics is located within a RPS instrument vault. Thus, all electronics are available under accident conditions. All RPS sensors are installed on the example reactor design such that replacement can be accomplished without major component disassembly. Most RPS sensors have installed spares such that a simple wiring change in an RPS vault will result in the "repair/replacement" of a faulted sensor.

(19) The RPS is fully modularized down to the least module tested and identified by the automatic diagnostics. Failures are automatically detected and annunciated, including module identification, to facilitate rapid location and repair.

(20) The system is tolerant of most human interactions (accidental or otherwise). To minimize the effects of human error, the system is fully automated and minimizes human interaction to that required by regulations (scram recovery)

and for changes in mode of operation (Startup/Operate or Shutdown/Maintenance) as directed by the reactor operator.

(21) In response to an operator request to change mode of operation from Shutdown/Maintenance to Startup/Operate, the RPS will first check its own software. Each division checks its software against an independent file maintained by the Reactor Control Operators in a higher level computer. Any failure to positively match between the five software files, will require resolution before the RPS will continue to execute a mode change. Another part of the mode change requirement is that all RPS monitored parameters must be "nominal". This not only includes trip parameters but the monitoring of interlocks and critical valve positions. Finally, the RPS will energize the control rod latch coils, de-energize the drive-in motors on all control rod carriages, and notify the operator that an ascent to power may be started.

Following a reactor scram, no PCS interlocked reactor control operations are possible until the RPS is manually requested to transition to the Shutdown/Maintenance mode. This meets the U.S. Code of Federal Regulations mandated operator input to initiate recovery following scram.

(22) The liquid metal reactor RPS makes extensive use of digital and computer technology for data evaluation, software logic, continuous self-testing, etc. and requires no bypassing (either manual or automatic) for reactor operation, system test, calibration, and/or maintenance operations.

All RPS sensor data, once digitized, are forwarded to the PCS. RPS parameters such a flux, flow, and core temperature are primary control feedback parameters for the PCS.

(23) The system accommodates failure and most multiple failures without a reduction in the protection capability and without initiating an unnecessary reactor shutdown.

(24) The RPS design concept is independent of the size of the reactor.

(25) The RPS is totally independent of other systems. However, because of functional interlocking, the Plant Control System (PCS) cannot operate the reactor without the proper functioning of the RPS.

The RPS is an active system that must be operating correctly for reactor operation. The RPS is totally independent of the Plant Control System (PCS) for operation and operates interactively to support the PCS. Thus the PCS is dependent upon the correct operation of the RPS for reactor major control parameter information and for control element coupling such that the PCS can withdraw control elements for reactor operation. The RPS further, independently, limits the amount of control element withdrawal that the PCS can make at any time. The RPS has no capability to withdraw any control element, a function performed by the PCS and limited by the RPS.

(26) All RPS active modules and components are failsafe (or "fail-as is" dependent upon which is the safer option).

(27) Automated self-testing and diagnostic monitoring, sensor input through output relay logic elements, virtually eliminate the need for routine, manual surveillance testing of the safety system.

The passive safety features of the example reactor design mean that the after scram-required actions of the RPS are complete, the RPS continues to provide sensor data for accident monitoring. Thus the RPS design is greatly simplified.

The foregoing preferred embodiment has been disclosed for the purpose of illustration. Variations and modifications to the preferred embodiment will be readily apparent to persons skilled in the design of reactor protection systems. All such variations and modifications are intended to be encompassed by the claims set forth hereinafter.

I claim:

1. A self-testing system for initiating safety action in response to monitoring of a critical parameter, comprising:

first through fourth sensors for independently detecting the value of a critical parameter and outputting first through fourth sensor readings respectively;

first through fourth division electronics respectively connected to said first through fourth sensors for processing said first through fourth sensor readings respectively and comprising respective means for outputting a safety actuation inhibition signal in response to said respective sensor reading being below a predetermined threshold voltage and terminating the output of said safety actuation inhibition signal in response to said respective sensor reading being above said predetermined threshold voltage; and cross communication channels for interconnecting said first through fourth division electronics such that each one of said first through fourth division electronics receives the processed sensor readings from the other division electronics, wherein each of said first through fourth division electronics further comprises means for inputting a respective reference voltage in place of said respective sensor reading and means for detecting a difference in the response of one of said division electronics to its own reference voltage and the response of another of said division electronics to its own reference voltage.

2. The self-testing system as defined in claim 1, wherein each of said first through fourth division electronics further comprises multiplexer means for polling said respective sensor and a source of said respective reference voltage in sequence.

3. The self-testing system as defined in claim 1, wherein each of said first through fourth division electronics further comprises means for respectively sampling the sensor readings from said first through fourth sensors, means for averaging said sampled sensor reading with a number of past sensor readings, and means for comparing the average sensor reading to predetermined sensor reasonability limits for indication of sensor failure.

4. The self-testing system as defined in claim 3, wherein each of said first through fourth division electronics further comprises means for digitizing said sampled sensor reading, and means for appending a verification flag to said digitized sensor reading for transmission to other division electronics by way of said cross communication channels, said verification flag being a function of the results of the comparison of the current sensor reading to the predetermined sensor reasonability limits.

5. The self-testing system as defined in claim 4, wherein each of said first through fourth division electronics further comprises means for issuing an error message in response to nonuniformity of valid sensor readings processed by different divisional electronics.

6. The self-testing system as defined in claim 1, further comprising a hardware logic circuit connected to receive an output from each of said first through fourth division electronics, wherein said hardware logic circuit changes from a normal state to a safety actuation state in response to discontinuance of receipt of safety actuation inhibition signals from at least two of said first through fourth division electronics.

7. The self-testing system as defined in claim 5, further comprising a safety actuator and an actuator power supply circuit, wherein said safety actuator is coupled to said actuator power supply circuit via said hardware logic circuit.

8. A self-testing system for initiating safety action in response to monitoring of a critical parameter, comprising:

first through fourth means for monitoring said critical parameter;

first through fourth division processing means for issuing first through fourth continuous safety actuation inhibition signals when said critical parameter does not exceed a predetermined threshold, and discontinuing said respective safety actuation inhibition signal when said critical parameter exceeds said predetermined threshold;

a hardware logic circuit connected to receive an output from each of said first through fourth division processing means, wherein said hardware logic circuit changes from a normal state to a safety actuation state in response to discontinuance of said safety actuation inhibition signals by at least two of said first through fourth division processing means;

a safety actuator;

an actuator power supply circuit, wherein said safety actuator is coupled to said actuator power supply circuit via said hardware logic circuit; and means for detecting the state of said hardware logic circuit, wherein each of said first through fourth division processing means comprises means for diagnosing a fault state of said hardware logic circuit as a function of the output of said detecting means.

9. The self-testing system as defined in claim 8, wherein said state detecting means comprises a plurality of sensors for outputting a respective analog signal representing the state of a respective portion of said hardware logic circuit, and means for converting said plurality of analog signals into a corresponding plurality of digital signals making up a hardware logic state code, and said diagnosing means outputs a signal indicating the presence or absence of a fault in said hardware logic circuit in dependence on said hardware logic state code.

10. The self-testing system as defined in claim 9, wherein said hardware logic circuit comprises first through fourth sets of circuit breakers each having an open state and a closed state and electrical connections for connecting the circuit breakers within each of said first through fourth sets in series, the state of the circuit breakers of said first through fourth sets being respectively controlled as a function of the signal output by said first through fourth division processing means respectively.

11. The self-testing system as defined in claim 10, wherein said first division processing means further comprise testing means for terminating the output of a safety actuation inhibition signal to said first set of circuit breakers during a time when the second through fourth division processing means are outputting safety actuation inhibition signals to said second through fourth sets of circuit breakers respectively.

12. The self-testing system as defined in claim 10, wherein said diagnosing means comprise a multiplicity of reference hardware logic state codes stored in read only memory.

13. The self-testing system as defined in claim 10, wherein said circuit breakers are interconnected to form a current interruption logic circuit.

14. The self-testing system as defined in claim 13, wherein said plurality of sensors comprise current sensors connected to different junction points between circuit breakers in said current interruption logic circuit for outputting a respective analog output signal as a function of the current at said respective junction point.

15. The self-testing system as defined in claim 10, wherein said circuit breakers are interconnected to form a voltage make logic circuit.

16. The self-testing system as defined in claim 15, wherein said plurality of sensors comprise voltage sensors connected across different circuit breakers in said voltage make logic circuit for outputting a respective analog output signal as a function of the voltage across said respective circuit breakers.

17. A self-testing reactor protection system for initiating a scram in a nuclear reactor in response to monitoring of a critical reactor parameter, comprising:

first through fourth reactor parameter sensors for independently detecting the value of a critical reactor parameter and outputting first through fourth sensor readings respectively;

first through fourth division electronics respectively connected to said first through fourth reactor parameter sensors for processing said first through fourth sensor readings respectively and comprising respective means for outputting a scram inhibition signal in response to said respective sensor reading being below a predetermined threshold voltage and terminating the output of said scram inhibition signal in response to said respective sensor reading being above said predetermined threshold voltage; and cross communication channels for interconnecting said first through fourth division electronics such that each one of said first through fourth division electronics receives the processed sensor readings from the other division electronics, wherein each of said first through fourth division electronics further comprises means for inputting a respective reference voltage greater than said predetermined threshold voltage in place of said respective sensor reading; means for outputting a scram inhibition signal despite the input of said respective reference voltage; means for detecting a difference in the response of one of said division electronics to its own reference voltage and the response of another of said division electronics to its own reference voltage; and means for issuing an error message in response to nonuniformity of the sensor readings processed by different divisional electronics.

18. The self-testing reactor protection system as defined in claim 17, further comprising:

a hardware logic circuit connected to receive an output from each of said first through fourth division electronics, wherein said hardware logic circuit changes from a normal state to a scram state in response to discontinuance of said scram inhibition signals by at least two of said first through fourth division electronics;

a safety actuator for effecting a scram operation;

an actuator power supply circuit, wherein said safety actuator is coupled to said actuator power supply circuit via said hardware logic circuit; and a plurality of hardware logic state sensors for detecting the state of said hardware logic circuit, wherein each of said first through fourth division electronics comprises means for diagnosing a fault state of said hardware logic circuit as a function of the output of said hardware logic state sensors.

19. The self-testing reactor protection system as defined in claim 18, wherein said hardware logic circuit comprises first through fourth sets of circuit breakers each having an open state and a closed state and electrical connections for connecting the circuit breakers within each of said first through fourth sets in series, the state of the circuit breakers of said first through fourth sets being respectively controlled as a function of the signal output by said first through fourth division electronics respectively, wherein said first division processing means further comprise testing means for terminating the output of a scram inhibition signal to said first set of circuit breakers during a time when the second through fourth division processing means are outputting scram inhibition signals to said second through fourth sets of circuit breakers respectively.

20. The self-testing reactor protection system as defined in claim 19, wherein each of said first through fourth division electronics further comprises multiplexer means for polling said respective reactor parameter sensor and said hardware logic state sensors in sequence, and means for preventing the activation of said testing means when active testing by another divisional electronics is detected.

21. A method for testing a system which initiates safety action in response to monitoring of a critical parameter, said system comprising:

first through fourth sensors for independently detecting the value of a critical parameter and outputting first through fourth sensor readings respectively;

first through fourth division electronics respectively connected to said first through fourth sensors for processing said first through fourth sensor readings respectively and comprising respective means for outputting a safety actuation inhibition signal in response to said respective sensor reading being below a respective predetermined threshold voltage and terminating the output of said safety actuation inhibition signal in response to said respective sensor reading being above said respective predetermined threshold voltage; and cross communication channels for interconnecting said first through fourth division electronics such that each one of said first through fourth division electronics receives the processed sensor readings from the other division electronics, wherein said method comprises the steps of:

polling said first through fourth sensors in sequence once during each polling cycle;

inputting a respective reference signal having a level in excess of said respective predetermined threshold level during each polling cycle, said reference voltage being treated as a sensor output;

terminating the output of said respective safety actuation inhibition signal by a selected one of said first through fourth division electronics in response to said respective reference signal being in excess of said respective predetermined threshold level during a selected one of said polling cycles; and inhibiting the termination of the output of said respective safety actuation inhibition signal by the ones of said first through fourth division electronics other than said selected one in response to said respective reference signal being in excess of said respective predetermined threshold level.

\* \* \* \* \*